United States Patent
Vermani et al.

(10) Patent No.: US 10,848,233 B2
(45) Date of Patent: Nov. 24, 2020

(54) MANAGING HIGH VOLUMES OF SPACE-TIME-STREAMS IN NEXT GENERATION EXTREMELY HIGH THROUGHPUT (EHT) WI-FI SYSTEMS

(71) Applicant: QUALCOMM Incorporated, San Diego, CA (US)

(72) Inventors: Sameer Vermani, San Diego, CA (US); Bin Tian, San Diego, CA (US); Jialing Li Chen, San Diego, CA (US); Lin Yang, San Diego, CA (US); Lochan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/154,574

(22) Filed: Oct. 8, 2018

(65) Prior Publication Data

US 2019/0115970 A1    Apr. 18, 2019

Related U.S. Application Data

(60) Provisional application No. 62/572,168, filed on Oct. 13, 2017.

(51) Int. Cl.
*H04B 7/08* (2006.01)
*H04L 5/00* (2006.01)
(Continued)

(52) U.S. Cl.
CPC ......... *H04B 7/0891* (2013.01); *H04B 7/0691* (2013.01); *H04J 11/003* (2013.01);
(Continued)

(58) Field of Classification Search
CPC .. H04B 7/0617; H04B 7/0413; H04B 7/0626; H04B 7/0421; H04B 7/0452;
(Continued)

(56) References Cited

U.S. PATENT DOCUMENTS

| | | | | |
|---|---|---|---|---|
| 2010/0248635 A1* | 9/2010 | Zhang | ................ | H04B 7/0413 455/63.1 |
| 2015/0372739 A1* | 12/2015 | Garrett | ................ | H04B 7/0408 370/329 |
| 2016/0204960 A1* | 7/2016 | Yu | ................ | H04B 7/0417 370/338 |

FOREIGN PATENT DOCUMENTS

EP        2911356 A1    8/2015

OTHER PUBLICATIONS

International Search Report and Written Opinion—PCT/US2018/055016—ISA/EPO—dated Mar. 19, 2019 (180240WO).
(Continued)

*Primary Examiner* — Leila Malek
(74) *Attorney, Agent, or Firm* — Holland & Hart LLP/Qualcomm

(57) ABSTRACT

This disclosure provides systems, methods, and apparatuses, including computer programs encoded on computer storage media, for managing high volumes of space-time-streams in Wi-Fi systems. An access point (AP) may transmit packets including long training field (LTF) sections using a number of space-time-streams greater than eight. Mobile stations (STAs) in the system may or may not be capable of processing this number of streams. The AP may modulate an LTF section using a matrix with dimensions smaller than the number of streams by using tone-interleaving or by performing modulation with separate matrices in time and frequency. In some other implementations, the AP may split the antennas for transmission into groups, each group transmitting either different packets in a subset of streams or a same packet in a subset of tones. In further implementations, the AP may combine multiple space-time-streams into a super stream that supports reception at different types of STAs.

25 Claims, 10 Drawing Sheets

(51) Int. Cl.
    *H04B 7/06*          (2006.01)
    *H04W 84/12*      (2009.01)
    *H04L 27/26*       (2006.01)
    *H04J 11/00*       (2006.01)
    *H04L 25/02*       (2006.01)

(52) U.S. Cl.
    CPC .......... *H04L 5/0023* (2013.01); *H04L 5/0044* (2013.01); *H04L 5/0048* (2013.01); *H04L 27/2613* (2013.01); *H04W 84/12* (2013.01); *H04J 2011/0009* (2013.01); *H04L 25/0204* (2013.01)

(58) Field of Classification Search
    CPC . H04B 7/0628; H04L 25/0204; H04L 1/0625; H04L 2025/03414; H04J 11/003
    USPC ........................................................ 375/148
    See application file for complete search history.

(56) References Cited

OTHER PUBLICATIONS

Partial International Search Report—PCT/US2018/055016—ISA/EPO—dated Jan. 16, 2019 (175528WO).

\* cited by examiner

US 10,848,233 B2

MANAGING HIGH VOLUMES OF SPACE-TIME-STREAMS IN NEXT GENERATION EXTREMELY HIGH THROUGHPUT (EHT) WI-FI SYSTEMS

CROSS-REFERENCE TO RELATED APPLICATIONS

This patent application claims priority to U.S. Provisional Patent Application No. 62/572,168 filed Oct. 13, 2017 entitled "Managing High Volumes of Space-Time-Streams in Next Generation Wi-Fi Systems," and assigned to the assignee hereof. The disclosure of the prior application is considered part of and is incorporated by reference in this patent application.

TECHNICAL FIELD

This disclosure relates to wireless communications, and more specifically to a next generation extremely high throughput (EHT) Wi-Fi system supporting a high volume of space-time-streams, such as sixteen space-time-streams.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (such as time, frequency, and power). A wireless network, for example a wireless local area network (WLAN) or Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink and uplink transmissions. The downlink (or forward link) may refer to the communication link from the AP to the STA, and the uplink (or reverse link) may refer to the communication link from the STA to the AP.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication. The method can include identifying a number of space-time-streams for transmission of null data packet (NDP) information in a set of tones, the NDP information containing a long training field (LTF) section that includes orthogonal frequency division multiplexing (OFDM) symbols, and determining that the number of space-time-streams is greater than a threshold number of streams. The method can further include transmitting a first subset of the NDP information corresponding to a first subset of antennas, where a number of the first subset of antennas is less than or equal to the threshold number of streams, and transmitting a second subset of the NDP information corresponding to a second subset of the antennas, where a number of the second subset of antennas is less than or equal to the threshold number of streams.

Another innovative aspect of the subject matter described in this disclosure can be implemented in an apparatus for wireless communication. The apparatus can include means for identifying a number of space-time-streams for transmission of NDP information in a set of tones, the NDP information containing an LTF section that includes OFDM symbols, and means for determining that the number of space-time-streams is greater than a threshold number of streams. The apparatus can further include means for transmitting a first subset of the NDP information corresponding to a first subset of antennas, where a number of the first subset of antennas is less than or equal to the threshold number of streams, and means for transmitting a second subset of the NDP information corresponding to a second subset of the antennas, where a number of the second subset of antennas is less than or equal to the threshold number of streams.

Another innovative aspect of the subject matter described in this disclosure can be implemented in another apparatus for wireless communication. The apparatus can include a processor, memory in electronic communication with the processor, and instructions stored in the memory. The instructions can be operable to cause the processor to identify a number of space-time-streams for transmission of NDP information in a set of tones, the NDP information containing an LTF section that includes OFDM symbols, and determine that the number of space-time-streams is greater than a threshold number of streams. The instructions can be further operable to cause the processor to transmit a first subset of the NDP information corresponding to a first subset of antennas, where a number of the first subset of antennas is less than or equal to the threshold number of streams, and transmit a second subset of the NDP information corresponding to a second subset of the antennas, where a number of the second subset of antennas is less than or equal to the threshold number of streams.

Another innovative aspect of the subject matter described in this disclosure can be implemented in a non-transitory computer-readable medium for wireless communication. The non-transitory computer-readable medium can include instructions operable to cause a processor to identify a number of space-time-streams for transmission of NDP information in a set of tones, the NDP information containing an LTF section that includes OFDM symbols, and determine that the number of space-time-streams is greater than a threshold number of streams. The instructions can be further operable to cause the processor to transmit a first subset of the NDP information corresponding to a first subset of antennas, where a number of the first subset of antennas is less than or equal to the threshold number of streams, and transmit a second subset of the NDP information corresponding to a second subset of the antennas, where a number of the second subset of antennas is less than or equal to the threshold number of streams.

In some implementations, the first subset of the NDP information can correspond to a first NDP and the second subset of the NDP information can correspond to a second NDP different from the first NDP. In some other implementations, the first subset of the NDP information and the second subset of the NDP information can both correspond to a same NDP, where the first subset of the NDP information may be transmitted in a first subset of the set of tones and the second subset of the NDP information may be transmitted in a second subset of the set of tones.

In some implementations, transmitting the first subset of the NDP information and transmitting the second subset of the NDP information may further involve transmitting the first subset of the NDP information and the second subset of the NDP information to a station (STA), where the threshold number of streams may be based on a capability of the STA. In some implementations, the capability of the STA includes at least one of a total number of space-time-streams the STA can process for a single NDP and a number of LTFs the STA can process for the single NDP.

In some implementations, both the first subset of antennas and the second subset of antennas can include at least one shared antenna. In some implementations, the method, apparatuses, and non-transitory computer-readable medium can include operations, features, means, or instructions for mitigating a phase offset between the first subset of the NDP information and the second subset of the NDP information based on the at least one shared antenna serving as a phase reference.

Another innovative aspect of the subject matter described in this disclosure can be implemented in a method for wireless communication. The method can include identifying a number of space-time-streams for transmission of a packet, the packet containing an LTF section that includes one or more OFDM symbols. The method can further include selecting an orthogonal matrix for modulation of the LTF section, where the size of a first and a second dimension of the orthogonal matrix is less than the number of space-time-streams used for transmission. Additionally, the method can include modulating the LTF section over the space-time-streams using the selected orthogonal matrix, and transmitting the packet including the modulated LTF section over a set of tones using the identified space-time-streams.

Another innovative aspect of the subject matter described in this disclosure can be implemented in an apparatus for wireless communication. The apparatus can include means for identifying a number of space-time-streams for transmission of a packet, the packet containing an LTF section that includes one or more OFDM symbols. The apparatus can further include means for selecting an orthogonal matrix for modulation of the LTF section, where a size of a first and a second dimension of the orthogonal matrix is less than the number of space-time-streams. Additionally, the apparatus can include means for modulating the LTF section over the space-time-streams using the selected orthogonal matrix and means for transmitting the packet including the modulated LTF section over a set of tones using the identified space-time-streams.

Another innovative aspect of the subject matter described in this disclosure can be implemented in another apparatus for wireless communication. The apparatus may include a processor, memory in electronic communication with the processor, and instructions stored in the memory. The instructions can be operable to cause the processor to identify a number of space-time-streams for transmission of a packet, the packet containing an LTF section that includes one or more OFDM symbols. The instructions can be further operable to cause the processor to select an orthogonal matrix for modulation of the LTF section, where a size of a first and a second dimension of the orthogonal matrix is less than the number of space-time-streams. Additionally, the instructions can be operable to cause the processor to modulate the LTF section over the space-time-streams using the selected orthogonal matrix, and transmit the packet including the modulated LTF section over a set of tones using the identified space-time-streams.

Another innovative aspect of the subject matter described in this disclosure can be implemented in a non-transitory computer-readable medium for wireless communication. The non-transitory computer-readable medium can include instructions operable to cause a processor to identify a number of space-time-streams for transmission of a packet, the packet containing an LTF section that includes one or more OFDM symbols. The instructions can further be operable to cause the processor to select an orthogonal matrix for modulation of the LTF section, where a size of a first and a second dimension of the orthogonal matrix is less than the number of space-time-streams. Additionally, the instructions can be operable to cause the processor to modulate the LTF section over the space-time-streams using the selected orthogonal matrix, and transmit the packet including the modulated LTF section over a set of tones using the identified space-time-streams.

In some implementations, modulating the LTF section over the space-time-streams using the selected orthogonal matrix may include operations, features, means, or instructions for spreading the space-time-streams over the one or more OFDM symbols of the LTF section using the selected orthogonal matrix.

In some implementations, modulating the LTF section over the space-time-streams using the selected orthogonal matrix may include operations, features, means, or instructions for modulating, for a first subset of the set of tones, the LTF section over a first subset of the space-time-streams using the selected orthogonal matrix and modulating, for a second subset of the set of tones, the LTF section over a second subset of the space-time-streams using a second orthogonal matrix. In some implementations, modulating the LTF section over the first subset of the space-time-streams using the selected orthogonal matrix and modulating the LTF section over the second subset of the space-time-streams using the second orthogonal matrix may include operations, features, means, or instructions for spreading the first subset of the space-time-streams over the one or more OFDM symbols of the LTF section for the first subset of the set of tones using the selected orthogonal matrix and spreading the second subset of the space-time-streams over the one or more OFDM symbols of the LTF section for the second subset of the set of tones using the second orthogonal matrix. Additionally, in some implementations, the first subset of the space-time-streams and the second subset of the space-time-streams are spread such that a STA receiving the packet interpolates the spread first subset of the space-time-streams and the spread second subset of the space-time-streams to determine the first subset of the space-time-streams over the one or more OFDM symbols of the LTF section for the second subset of the set of tones and the second subset of the space-time-streams over the one or more OFDM symbols of the LTF section for the first subset of the set of tones.

In some implementations, both the first subset of the space-time-streams and the second subset of the space-time-streams include at least one shared space-time-stream. Additionally, or alternatively, in some implementations, the selected orthogonal matrix and the second orthogonal matrix may be the same.

In some implementations, the method, apparatuses, and non-transitory computer-readable medium can include operations, features, means, or instructions for grouping the set of tones into a set of tone blocks, selecting a third orthogonal matrix for modulation of the space-time-streams within each of the set of tone blocks, and modulating, for each of the set of tone blocks, the space-time-streams using the selected third orthogonal matrix to obtain orthogonal signals in neighboring tones of the set of tones. In some implementations, modulating the space-time-streams using the selected third orthogonal matrix can include operations, features, means, or instructions for spreading the space-time-streams over the set of tones using the selected third orthogonal matrix. In some implementations, a first dimension of the selected third orthogonal matrix multiplied by the first dimension of the selected orthogonal matrix may be greater than or equal to the number of space-time-streams, where the first dimension of the selected third orthogonal matrix may be less than the number of space-time-streams.

In some implementations, the LTF section can include a compressed LTF section and the set of tones can include a number of tones that is less than a number of tones corresponding to an uncompressed LTF section.

Another innovative aspect of the subject matter described in this disclosure can be implemented in a method of wireless communication. The method can include identifying a number of space-time-streams for transmission of a packet and determining that the number of the space-time-streams is greater than a threshold number of space-time-streams. The method can further include combining a number of the space-time-streams to form one or more super streams, where a total number of the one or more super streams and any remaining uncombined space-time-streams is less than or equal to the threshold number of streams, and transmitting the packet over a set of tones using the one or more super streams and the remaining uncombined space-time-streams.

Another innovative aspect of the subject matter described in this disclosure can be implemented in an apparatus for wireless communication. The apparatus can include means for identifying a number of space-time-streams for transmission of a packet and means for determining that the number of the space-time-streams is greater than a threshold number of space-time-streams. The apparatus can further include means for combining a number of the space-time-streams to form one or more super streams, where a total number of the one or more super streams and any remaining uncombined space-time-streams is less than or equal to the threshold number of streams, and means for transmitting the packet over a set of tones using the one or more super streams and the remaining uncombined space-time-streams.

Another innovative aspect of the subject matter described in this disclosure can be implemented in another apparatus for wireless communication. The apparatus can include a processor, memory in electronic communication with the processor, and instructions stored in the memory. The instructions can be operable to cause the processor to identify a number of space-time-streams for transmission of a packet and determine that the number of the space-time-streams is greater than a threshold number of space-time-streams. The instructions can be further operable to cause the processor to combine a number of the space-time-streams to form one or more super streams, where a total number of the one or more super streams and any remaining uncombined space-time-streams is less than or equal to the threshold number of streams, and transmit the packet over a set of tones using the one or more super streams and the remaining uncombined space-time-streams.

Another innovative aspect of the subject matter described in this disclosure can be implemented in a non-transitory computer-readable medium for wireless communication. The non-transitory computer-readable medium can include instructions operable to cause a processor to identify a number of space-time-streams for transmission of a packet and determine that the number of the space-time-streams is greater than a threshold number of space-time-streams. The instructions can be further operable to cause the processor to combine a number of the space-time-streams to form one or more super streams, where a total number of the one or more super streams and any remaining uncombined space-time-streams is less than or equal to the threshold number of streams, and transmit the packet over a set of tones using the one or more super streams and the remaining uncombined space-time-streams.

In some implementations, each of the one or more super streams may be designed such that a first type of STAs receive the super stream as a single space-time-stream and a second type of STAs receive the super stream as a set of separate space-time-streams. In these implementations, the first type of STAs can include STAs capable of receiving a total number of space-time-streams equal to or less than the threshold number of space-time-streams and the second type of STAs can include STAs capable of receiving a total number of space-time-streams greater than the threshold number of space-time-streams.

In some implementations, the packet can include an LTF section. In these implementations, the method, apparatuses, and non-transitory computer-readable medium can include operations, features, means, or instructions for selecting an orthogonal matrix for modulation of the LTF section, where each row of the selected orthogonal matrix corresponds to a super stream, an uncombined space-time-stream, or a set of combined space-time-streams.

In some implementations, a first row of the selected orthogonal matrix can correspond to a set of combined space-time-streams. In these implementations, the method, apparatuses, and non-transitory computer-readable medium can include operations, features, means, or instructions for spreading a first space-time-stream of the set of combined space-time-streams over the LTF section for a first subset of the set of tones using the first row of the selected orthogonal matrix and spreading a second space-time-stream of the set of combined space-time-streams over the LTF section for a second subset of the set of tones using the first row of the selected orthogonal matrix.

Another innovative aspect of the subject matter described in this disclosure can be implemented in a method of wireless communication. The method can include identifying a number of space-time-streams for transmission of NDP information in a set of tones, the NDP information containing an LTF section that includes one or more OFDM symbols, and determining that the number of the space-time-streams is greater than a threshold number of streams. The method can further include grouping the set of tones into a number of tone blocks, modulating an NDP including the NDP information across the one or more OFDM symbols of the LTF section using a first orthogonal matrix and across each of the tone blocks using a second orthogonal matrix, and transmitting the modulated NDP over the set of tones using the identified space-time-streams.

Another innovative aspect of the subject matter described in this disclosure can be implemented in an apparatus for wireless communication. The apparatus can include means for identifying a number of space-time-streams for transmission of NDP information in a set of tones, the NDP information containing an LTF section that includes one or more OFDM symbols, and means for determining that the number of the space-time-streams is greater than a threshold number of streams. The apparatus can include further means for grouping the set of tones into a number of tone blocks, means for modulating an NDP including the NDP information across the one or more OFDM symbols of the LTF section using a first orthogonal matrix and across each of the tone blocks using a second orthogonal matrix, and means for transmitting the modulated NDP over the set of tones using the identified space-time-streams.

Another innovative aspect of the subject matter described in this disclosure can be implemented in another apparatus for wireless communication. The apparatus can include a processor, memory in electronic communication with the processor, and instructions stored in the memory. The instructions can be operable to cause the processor to identify a number of space-time-streams for transmission of NDP information in a set of tones, the NDP information containing an LTF section that includes one or more OFDM symbols, and determine that the number of the space-time-streams is greater than a threshold number of streams. The instructions can be further operable to cause the processor to group the set of tones into a number of tone blocks, modulate an NDP including the NDP information across the one or more OFDM symbols of the LTF section using a first orthogonal matrix and across each of the tone blocks using a second orthogonal matrix, and transmit the modulated NDP over the set of tones using the identified space-time-streams.

Another innovative aspect of the subject matter described in this disclosure can be implemented in a non-transitory computer-readable medium for wireless communication. The non-transitory computer-readable medium can include instructions operable to cause a processor to identify a number of space-time-streams for transmission of NDP information in a set of tones, the NDP information containing an LTF section that includes one or more OFDM symbols, and determine that the number of the space-time-streams is greater than a threshold number of streams. The instructions can be further operable to cause the processor to group the set of tones into a number of tone blocks, modulate an NDP including the NDP information across the one or more OFDM symbols of the LTF section using a first orthogonal matrix and across each of the tone blocks using a second orthogonal matrix, and transmit the modulated NDP over the set of tones using the identified space-time-streams.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
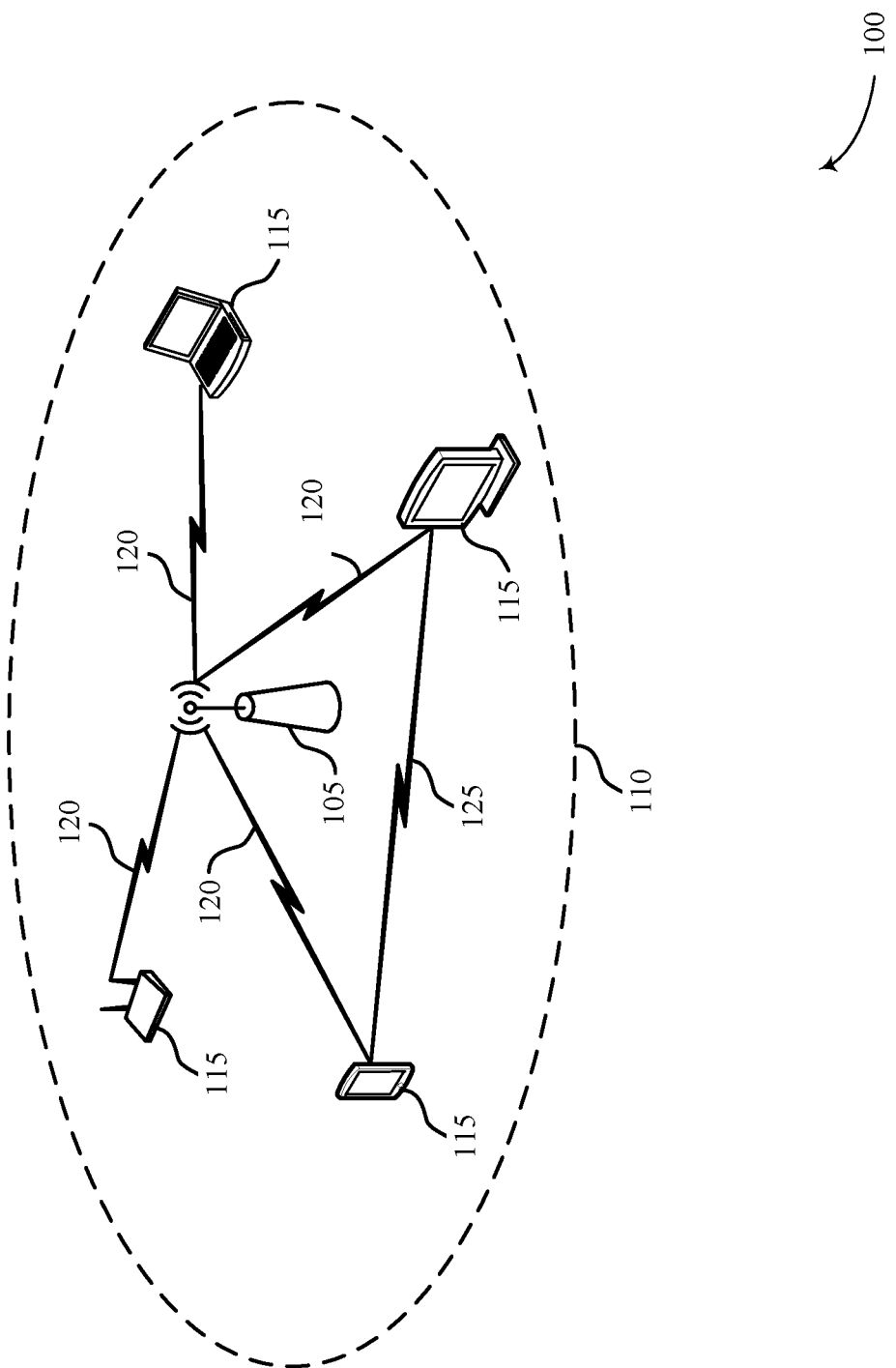
FIGS. 1 and 2 show examples of wireless communications systems that support high volumes of space-time-streams.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Techniques are disclosed for wireless devices to support a high volume of space-time-streams (for example, greater than eight space-time-streams). In a wireless communications system, an access point (AP) may perform spatial multiplexing to improve throughput to one or more mobile stations (STAs). According to these techniques, the AP may identify a number of space-time-streams, which may alternatively be referred to as spatial streams or, simply, streams, for spatial multiplexing, and may transmit a packet to one or more STAs using the identified streams. The packet may include at least a long training field (LTF) section for the purposes of channel estimation, the LTF section including one or more orthogonal frequency division multiplexing (OFDM) symbols. Additionally, the AP may perform a modulation process prior to transmitting the packet in order to improve separation of the space-time-streams at a receiving STA.

An AP may perform modulation during the LTF section using one or more P matrices, which may be examples of square orthogonal matrices. A first dimension of each P matrix may correspond to LTF symbols or indices, while the second dimension may correspond to space-time-streams. In some implementations, an AP may select a P-matrix for modulation with dimensions smaller than the number of space-time-streams being transmitted. The AP may perform the modulation process on the LTF section using the selected P-matrix.

In some implementations, the AP may modulate the LTF section with the smaller P-matrix using tone-interleaving. For example, the AP may modulate the LTF section over a subset of the space-time-streams in a first set of tones using the P-matrix. The AP may additionally modulate the LTF section over a second subset of the space-time-streams in a second set of tones (for example, either using the same P-matrix or a different P-matrix). In other implementations, the AP may modulate space-time-streams over the LTF symbols with the smaller P-matrix and use a second orthogonal matrix for modulating the space-time-streams over frequency to ensure orthogonality. For example, the AP may modulate the LTF section across OFDM symbols using the selected P-matrix, and may select the same or a different orthogonal matrix for modulating across blocks of frequency tones. In some other implementations, rather than selecting a smaller P-matrix, the AP may be configured to select a P-matrix equal in size to the number of space-time-streams (for example, the AP may use a 16×16 P-matrix for modulating sixteen LTF symbols over sixteen space-time-streams).

Additionally, or alternatively, the AP may manage STAs with lesser sounding capabilities than the number of space-time-streams. For example, some types of STAs may not be configured to process spatial multiplexing with a high volume of space-time-streams (such as sixteen streams) during the sounding process. In some implementations, and AP may employ dual/tone-interleaved NDP approaches or frequency-domain orthogonal matrix modulation approaches. In some implementations, an AP transmitting a packet, such as a null data packet (NDP), with a high volume of space-time-streams to such a STA may transmit some of the NDP information in a first NDP using a first set of antennas and some of the NDP information in a second NDP using a second set of antennas. In some other implementations, the AP may transmit a single NDP, but may transmit the NDP in a first set of tones using a first set of antennas and in a second set of tones using a second set of antennas. These two sets of tones may be interleaved in the frequency domain. Antennas, as referred to above, may be examples of physical antennas, antenna ports, or virtual antennas. In yet other implementations, the AP may modulate the LTF section of the NDP in the time domain using a first orthogonal matrix and in the frequency domain using a second orthogonal matrix.

In some wireless communications systems, the AP may transmit packets both to the types of STAs not configured to process spatial multiplexing with a high volume of space-time-streams and to the types of STAs configured to process spatial multiplexing with a high volume of space-time-streams. In some implementations, STAs capable of processing up to eight space-time-streams or eight LTFs in sounding may be referred to as "legacy" STAs, while STAs capable of processing up to sixteen space-time-streams or sixteen LTFs in sounding—that is, a high volume of space-time-streams or LTFs—may be referred to as extremely high throughput (EHT) STAs or Next Generation STAs. In such systems, the AP may perform aggregation of space-time-streams into super streams, and may reduce the number of LTFs corresponding to a high number of streams by implementing a number of super-stream techniques. For example, in some implementations, the AP may share a channel estimation resource (e.g., a row of a P-matrix) during modulation between different streams across tones. Such streams that share a channel estimation resource may constitute a super-stream. STAs not configured for the high volume of space-time-streams may receive each super stream as if it is a single space-time-stream, while STAs configured for the high volume of space-time-streams may separately receive each space-time-stream contained within a super stream. In some implementations, the AP may utilize downlink multi-user, multiple-input, multiple-output (DL MU-MIMO) techniques to transmit a high volume of spatial streams to STAs with lesser reception capabilities. In some other implementations, super streams may be implemented for uplink transmissions as well. STAs configured to support the high volume of space-time-streams may transmit to an AP in one or more super streams, where each super stream includes multiple space-time-streams transmitted in the uplink. STAs not configured to support the high volume of space-time-streams may transmit simultaneously (for example, using single space-time-streams), and may not identify the presence of the multiple streams within each uplink super stream.

Particular implementations of the subject matter described in this disclosure can be implemented to realize one or more of the following potential advantages. Specifically, the proposed techniques allow for an AP to transmit packets to one or more STAs using a high volume of space-time-streams (for example, greater than eight space-time-streams). Transmitting using a high volume of space-time-streams increases spatial multiplexing, resulting in an improved spectral efficiency. An AP configured to perform the proposed techniques may therefore increase the number of bits it can transmit in given time and frequency intervals, increasing network throughputs and reducing latency in the Next Generation Wi-Fi system. Additionally, the proposed techniques allow for an AP using the high volume of space-time-streams to transmit simultaneously to STAs with different capabilities. For example, the AP may utilize its full spatial multiplexing capability, even in systems including STAs not configured to support the high volume of spatial streams (for example, by implementing super streams). This may improve the usage rate of the space-time-streams and allow the AP to efficiently utilize the channel, regardless of the configurations of the receiving STAs. Another potential advantage of the proposed techniques is the ability for an AP or STA to use a P-matrix of a smaller dimension than the number of space-time-streams in a downlink or uplink packet, which may lead to easier implementations (e.g., implementations that are less complex with respect to processing or memory resources).

FIG. 1 shows an example of a wireless communications system 100 that supports high volumes of space-time-streams. The system may be an example of a wireless local area network (WLAN) (such as a Next Generation, Next Big Thing (NBT), Ultra-High Throughput (UHT) or EHT Wi-Fi network) configured in accordance with various aspects of the present disclosure. As described herein, the terms Next Generation, NBT, UHT, and EHT may be considered synonymous and may each correspond to a Wi-Fi network supporting a high volume of space-time-streams (with one non-limiting example including sixteen streams). The wireless communications system 100 may include an AP 105 and multiple associated STAs 115, which may represent devices such as mobile stations, personal digital assistant (PDAs), other handheld devices, netbooks, notebook computers, tablet computers, laptops, display devices (such as TVs, computer monitors, etc.), printers, etc. The AP 105 and the associated STAs 115 may represent a basic service set (BSS) or an extended service set (ESS). The various STAs 115 in the network may communicate with one another through the AP 105 or directly via device-to-device (D2D) communication. Also shown is a coverage area 110 of the AP 105, which may represent a basic service area (BSA) of the wireless communications system 100. An extended network station (not shown) associated with the wireless communications system 100 may be connected to a wired or wireless distribution system that may allow multiple APs 105 to be connected in an ESS. In some implementations, an AP 105 may transmit to one or more STAs 115 using a high volume of space-time-streams (for example, greater than eight space-time-streams, which also may be referred to as spatial streams or, simply, streams). The AP 105 may perform modulation and transmission to manage this high volume of space-time-streams, as well as to support both STAs 115 that support high volumes of streams and STAs 115 that do not support high volumes of streams.

Although not shown in FIG. 1, a STA 115 may be located at the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some implementations, the coverage area 110 of an AP 105 may be divided into sectors (also not shown). The wireless communications system 100 may include APs 105 of different types (such as metropolitan area APs, home network APs, etc.) with varying and overlapping coverage areas 110. The AP 105 may communicate with one or more STAs 115 within the coverage area 110 corresponding to the AP 105. For example, the AP 105 may communicate with a STA 115 over a communication link 120, where transmissions from the AP 105 to the STA 115 may be referred to as downlink transmissions and transmissions from the STA 115 to the AP 105 may be referred to as uplink transmissions. Additionally, two STAs 115 also may communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, and subsequent versions. In some other implementations, peer-to-peer connections or ad hoc networks may be implemented within the wireless communications system 100.

In some implementations, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (such as an environment or system supporting carrier-sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

The various systems and methods described may provide means to support a high volume of space-time-streams present in Wi-Fi communications. In some wireless communications systems 100, an AP 105 may transmit a packet containing an LTF section using a given number of streams, where a STA 115 may receive and further decode the packet. For improved spectral efficiency, the AP 105 may transmit using up to sixteen streams (and, correspondingly using up to sixteen LTFs), which may be referred to as a high volume of space-time-streams. In some implementations, the AP 105 may modulate the LTF section using a square orthogonal matrix with dimensions smaller than the number of streams or LTF indices. For example, the AP 105 may store an 8×8 matrix in memory for packet modulation and may use this 8×8 matrix for modulating when transmitting with any number of space-time-streams. Using a smaller P-matrix for modulation may allow the AP 105 to store fewer matrices in memory, and may support backwards compatibility with STAs 115 or other APs 105 that do not support a high volume of space-time-streams.

In some implementations, a STA 115 receiving the packet may be unable to process a large number of space-time-streams (for example, greater than eight space-time-streams) due to one or more capabilities of the STA 115. In these implementations, the AP 105 may modulate the LTF section using an orthogonal matrix with dimensions less than the number of tone-interleaved streams, or by utilizing separate matrices to modulate the LTF over for example, time and frequency resources. Additionally, or alternatively, the AP 105 may identify subsets of antennas to sound in separate attempts, where each group of antennas may transmit the packet across different subsets of tones. The AP 105 may further combine the number of space-time-streams to create a super stream to support reception at various different types of STAs 115. For example, implementing super streams may allow for the AP 105 to obtain the spectral efficiency benefits provided by a high volume of space-time-streams even in a wireless communications system 100 where some STAs 115 are incapable of processing this high volume of space-time-streams.

Figure 2:
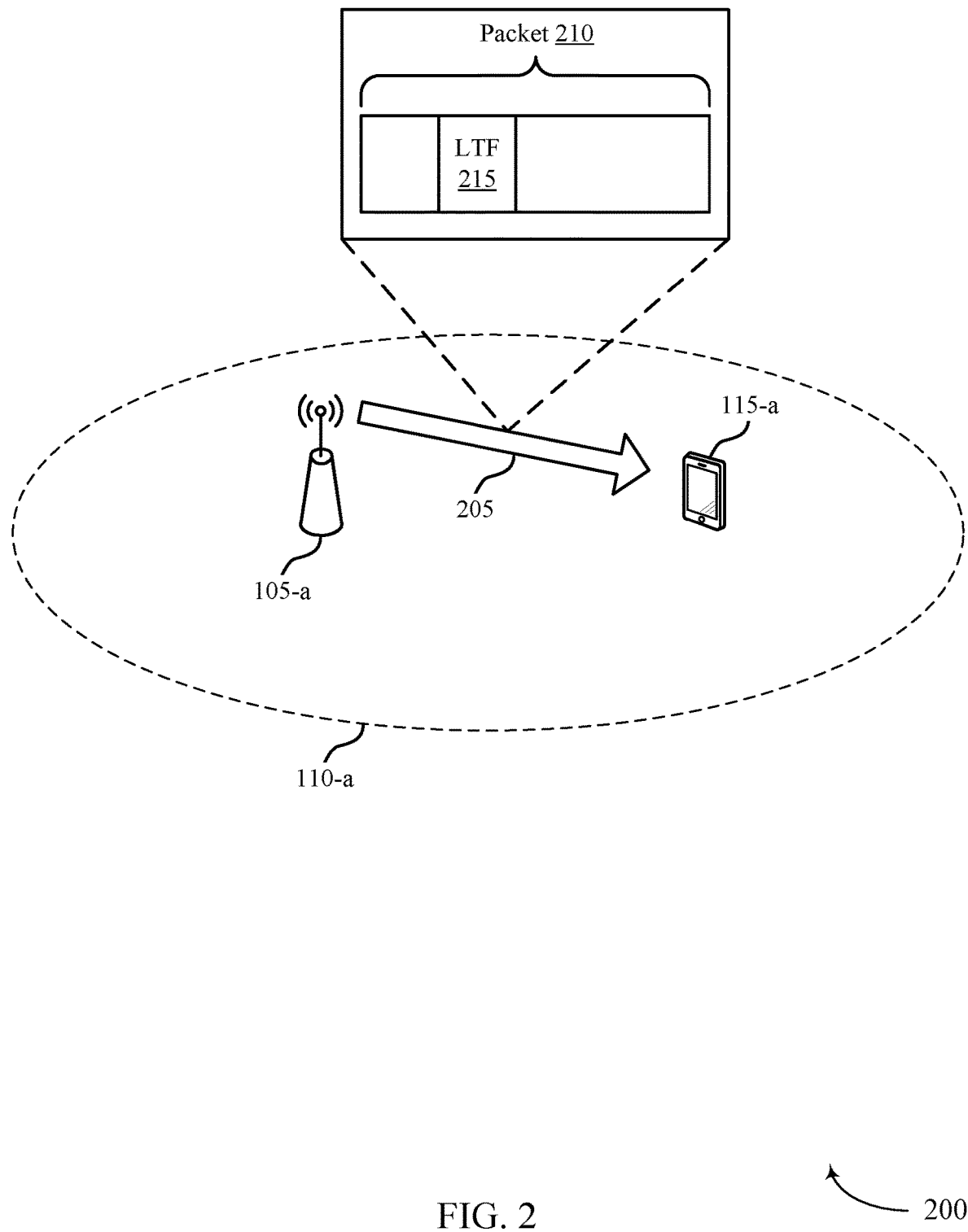

FIG. 2 shows an example of a wireless communications system 200 that supports high volumes of space-time-streams. The wireless communications system 200 may be an example of a Next Generation or EHT Wi-Fi system, and may include an AP 105-*a*, a STA 115-*a*, and a coverage area 110-*a*, which may be examples of the corresponding components described with respect to FIG. 1. The AP 105-*a* may transmit a packet 210 on the downlink 205 to the STA 115-*a* using a number of space-time-streams. The packet may include an LTF section 215.

Some configurations of wireless communications systems (for example, "legacy" systems) may support up to eight space-time-streams or spatial streams for simultaneous communication, which may represent the total number of streams across all users or STAs 115-*a* served by a same AP 105. However, some Next Generation or EHT Wi-Fi systems, such as a wireless communications system 200, may support configurations to manage a higher volume of space-time-streams (that is, higher than the legacy systems). For example, the wireless communications system 200 may include support for a number of space-time-streams larger than eight (such as sixteen space-time-streams). The AP 105-*a*, the STA 115-*a*, or both may include capabilities for processing up to sixteen space-time-streams at a same instant in time (for example, during a same transmission time interval (TTI)).

To communicate information contained in the packet 210 to the STA 115-*a*, the AP 105-*a* may employ methods to modulate the LTF section 215 prior to transmission. The modulation process for the LTF section 215 may be part of a larger modulation procedure for the entire packet 210. The LTF section 215 may span one or more OFDM symbols and may include information used for initial channel estimation at the STA 115-*a*. For example, the LTF section 215 may include a number of long training symbols (i.e., LTF symbols) and a cyclic prefix. A STA 115-*a* receiving the LTF section 215 may use the repeated long training symbols for frequency offset estimation, channel estimation, etc. The AP 105-*a* may select an orthogonal matrix (for example, a P-matrix) to modulate the LTF section 215 over a number of space-time-streams. This modulation process may involve spreading each space-time-stream over the time and frequency resources allocated for the LTF section 105-*a*. One example of a 6×6 P-matrix may be an orthogonal discrete Fourier transform (DFT) matrix used in signal processing methods:

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}$$

In the above example, the constant w may be defined as w=exp(−j2π/6). The dimensions of the P-matrix may be based on the number of LTF indices and the number of space-time-streams. For example, each column of the matrix may correspond to an LTF index, and each row of the matrix may correspond to a space-time-stream. The DFT P-matrix may multiply the frequency-domain LTF sequence for the LTF section 215 to obtain LTF sequences spread across the time-domain for each of the space-time-streams. A STA 115-*a* receiving the LTF symbols (for example, for all of the spatial streams) may separate the different spatial streams based on the orthogonality of the P-matrix used for modulation.

An AP 105-*a* configured to use higher volumes of space-time-streams may store P-matrices to manage these higher numbers of streams. For example, an AP 105-*a* in a Next Generation or EHT Wi-Fi system may store a variety of orthogonal matrices (for example, a 10×10 matrix, a 12×12 matrix, a 14×14 matrix, a 16×16 matrix, etc.) for handling larger numbers of space-time-streams. These larger P-Matrices extended for higher dimensions may be commonly defined across EHT wireless communications systems 200. In some implementations, these matrices may be composed of smaller P-matrices as sub-components. In one example, a 12×12 P-matrix may be constructed using constituent 6×6 orthogonal P-matrices, such that:

$$P_{12\times 12} = \begin{bmatrix} P_{6\times 6} & P_{6\times 6} \\ P_{6\times 6} & -P_{6\times 6} \end{bmatrix}.$$

In another example, a 16×16 matrix may be constructed using 8×8 orthogonal P-matrices as building blocks:

$$P_{12\times 12} = \begin{bmatrix} P_{8\times 8} & P_{8\times 8} \\ P_{8\times 8} & -P_{8\times 8} \end{bmatrix}.$$

Additional higher-dimensional matrices (for example, matrices larger than 8×8) may be constructed using similar methods. For example, an AP 105-*a* may store a 10×10 matrix, a 14×14 matrix, or both constructed by performing element-by-element multiplication on existing (that is, smaller) matrices or on arrays. One example of code for constructing such a 10×10 P-matrix includes:

$z = \exp(jmath * 2 * pi/10);$ first_row = [ 1 −1 1 1 1 −1 1 1 1 −1 ];

vector[ 1 z z^2 z^3 z^4 z^5 z^6 z^7 z^8 z^9 ];

P = [first_row; first_row.*vector; first_row.*(vector.^2);

first_row.*(vector.^3); first_row.*(vector.^4);

first_row.*(vector.^5); first_row.*(vector.^6); first_row.*(vector.^7);

first_row.*(vector.^8); first_row.*(vector.^9);], where the "first row" array can include any values and the P-matrix may maintain orthogonality (although an array of all "1s" may result in a spectral line) and ".*" corresponds to the element-by-element multiplication operation. In this example, the code may result in a 10×10 orthogonal P-matrix based on the dimensions of the first row and the number of rows specific by the variable P. Other mathematical operations may be performed on smaller P-matrices or arrays to produce new matrices with desired dimensions for storage at the APs 105, the STAs 115, or both. Each constituent matrix may be an example of an orthogonal DFT matrix or may contain different characteristic entries to avoid creating spectral lines or channel interferences.

The number of high volume matrices—for example, matrices with dimensions greater than 8×8—stored by the AP 105-*a* may be limited by an LTF overhead wastage threshold. For example, if the AP 105-*a* stores one P-matrix larger than 8×8, such as a 16×16 matrix, the AP 105-*a* transmits a full set of sixteen LTF symbols for any number of space-time-streams greater than eight streams. In this example, if the AP 105-*a* transmits using ten space-time-streams, the AP 105-*a* may experience an LTF overhead wastage of six LTFs, as a full set of sixteen LTF symbols is used for ten space-time-streams in order to support modulation by the 16×16 orthogonal matrix. Alternatively, if the AP 105-*a* stores a 10×10 matrix in addition to the 16×16 matrix, the AP 105-*a* may use additional memory resources for storing the additional matrix, but may reduce the LTF overhead wastage by transmitting ten LTFs when transmitting using ten space-time-streams. In this way, the AP 105-*a* may experience a tradeoff between the number of P-matrices stored in memory and the LTF overhead wastage, where a greater number of stored P-matrices results in less LTF overhead wastage but greater memory usage. As such, in some implementations, AP 105-*a* may store multiple P-matrices, including both small P-matrices (that is, P-matrices with dimensions 8×8 or smaller) and large P-matrices (that is, P-matrices with dimensions larger than 8×8). For example, an AP 105-*a* may store P-matrices including $P_{2\times 2}$, $P_{4\times 4}$, $P_{6\times 6}$, $P_{8\times 8}$, $P_{10\times 10}$, $P_{12\times 12}$, $P_{14\times 14}$, and $P_{16\times 16}$.

In some implementations, an AP 105-*a* may use a P-matrix for modulation such that each dimension of the P-matrix is less than the total number of space-time-streams. For example, rather than store high volume P-matrices with dimensions greater than 8×8, the AP 105-*a* may use smaller P-matrices, such as an 8×8 orthogonal P-matrix, to modulate LTFs for high volume space-time-stream transmissions. The AP 105-*a* may modulate the LTF section 215 over the space-time-streams using the selected P-matrix and may transmit the modulated LTF 215 over a set of tones corresponding to the space-time-streams. To handle modulation of the LTF section 215 with a P-matrix that has dimensions smaller than the number of space-time-streams, the AP 105-a may use one or more modulation techniques as described below with reference to FIGS. 3 and 4.

Figure 3:
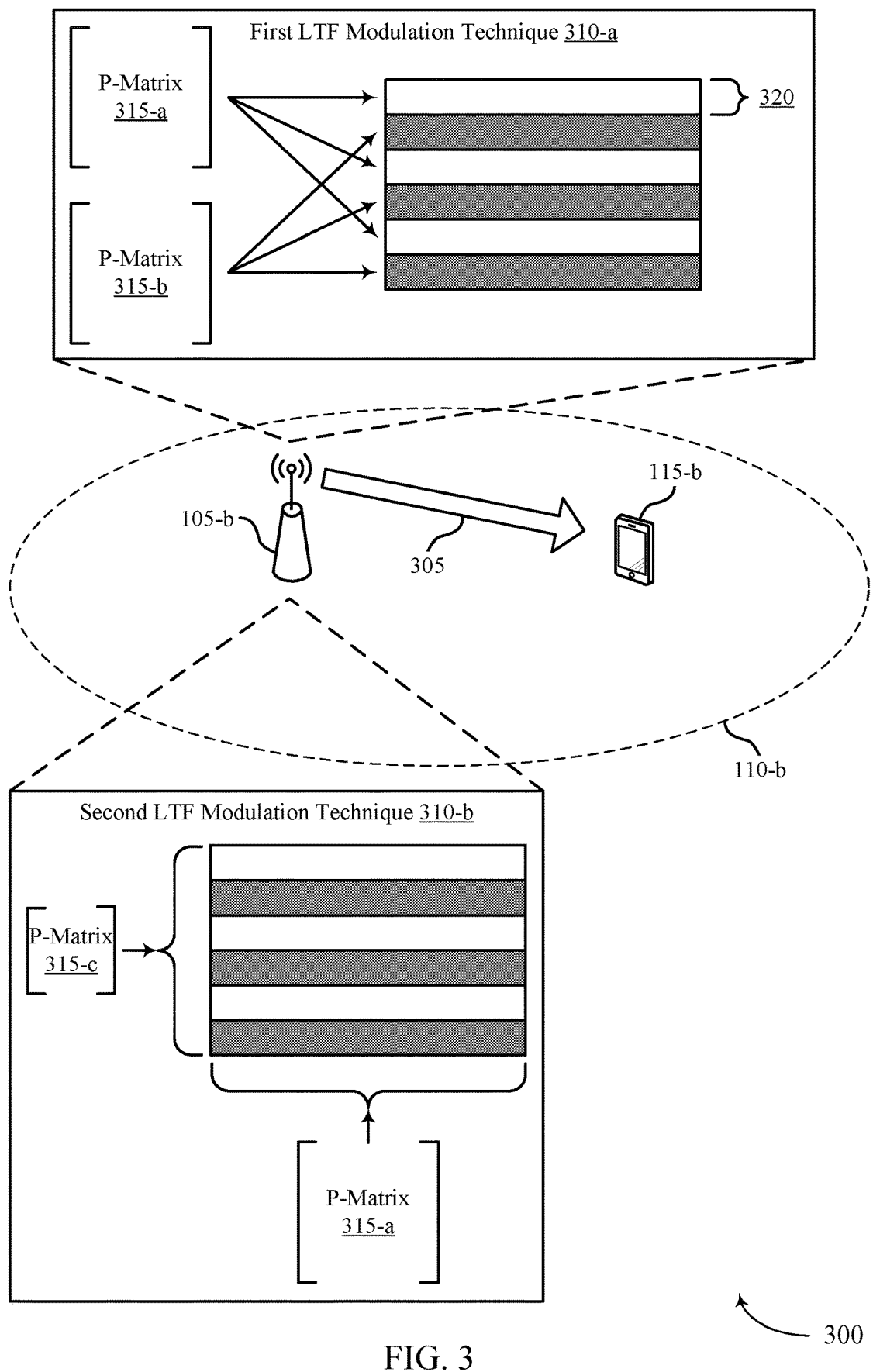
FIG. 3 shows an example of techniques for performing long training field (LTF) modulation in a wireless communications system that supports high volumes of space-time-streams.

FIG. 3 shows an example of techniques for performing LTF modulation in a wireless communications system 300 that supports high volumes of space-time-streams. The wireless communications system 300 may be an example of a Next Generation or EHT Wi-Fi system, and may include an AP 105-b, a STA 115-b, and a coverage area 110-b, which may be examples of the corresponding components described with respect to FIGS. 1 and 2. The AP 105-b may transmit a packet on the downlink 305 to the STA 115-b using a number of space-time-streams. The AP 105-b may use a first LTF modulation technique 310-a, a second LTF modulation technique 310-b, or a combination thereof to modulate an LTF section of the packet for transmission. In the first LTF modulation technique 310-a, the AP 105-b may use a first P-matrix 315-a to modulate a first group of space-time-streams across the LTF symbols over a first set of frequency tones 320 and may use a second P-matrix 315-b to modulate a second group of space-time-streams across the LTF symbols over a second set of frequency tones 320. The first and second sets of frequency tones 320 may be interleaved. In the second LTF modulation technique 310-b, the AP 105-b may modulate the space-time-streams across symbols in the time domain using a first P-matrix 315-a and may modulate the space-time-streams across frequency tones 320 in the frequency domain using a third P-matrix 315-c.

In some implementations, an AP 105-b and a STA 115-b may utilize a smaller P-matrix 315 for estimating a channel with a larger number of space-time-streams (for example, an AP 105-b may modulate an LTF section with sixteen space-time-streams using a P-matrix 315 with dimensionality less than 16×16). In a first LTF modulation technique 310-a, the AP 105-b may modulate and transmit different groups of streams on different frequency tones 320. In one implementation, the first LTF modulation technique 310-a may be an example of a tone-interleaving process, where the AP 105-b may switch between or select certain tones for certain space-time-streams to support a higher number of space time streams in a network. The AP 105-b may modulate stream groups using multiple orthogonal P-matrices 315, such as P-matrix 315-a and P-matrix 315-b, which in some implementations may be examples of the same matrix. In the first LTF modulation technique 310-a, AP 105-b may separate the total number of space-time-streams (for example, sixteen streams) into stream sets each containing a number of streams less than or equal to the size of the P-matrix 315 for modulation (for example, a first set of streams 1-8 and second set of streams 9-16 if P-matrices 315-a and 315-b are at least 8×8). The AP 105-b may identify a number of frequency tones 320 for transmission of the packet and may use a tone interleaving technique to transmit the sixteen streams with less than sixteen corresponding LTFs (for example, eight LTFs and an 8×8 P-matrix may be used for sixteen space-time-streams). In an example, the AP 105-b modulates streams 1-8 using the P-matrix 315-a over the odd frequency tones 320 and modulates streams 9-16 using the P-matrix 315-b over the even tones and transmits these subsets of space-time-streams on the alternating frequency tones 320.

A receiving STA 115-b may receive the packet with the modulated LTFs, and may use interpolation to determine the channel for every stream on every frequency tone 320. For example, the STA 115-b may use interpolation or another estimation technique to estimate the channel for streams 1-8 on the even tones and for streams 9-16 on the odd tones. In some implementations, the interpolation process may involve the STA 115-b averaging values for corresponding alternate tones to determine a value for an intermediate frequency tone 320. For example, for the first space-time-stream, the STA 115-b may average two odd frequency tones 320 to estimate the channel associated with the even frequency tone 320 between the two odd frequency tones 320.

In a second LTF modulation technique 310-b, modulating an LTF section in both time and frequency may provide separation between space-time-streams on adjacent tones without tone interleaving. An AP 105-b may apply an orthogonal code over time resources using a P-matrix 315-a. Additionally, the AP 105-b may apply an orthogonal code over frequency resources (for example, frequency tones 320) using a P-matrix 315-c to separate spatial streams over tone blocks. While P-matrices 315-a and 315-c may each have smaller dimensions than the number of space-time-streams, in combination the P-matrices 315 may modulate the larger number of streams (for example, sixteen streams). P-matrix 315-a and P-matrix 315-c may be the same matrix or may be different matrices. In one example, the AP 105-b may use a P-matrix 315-a of one size (for example, an 8×8 P-matrix) to modulate across OFDM symbols and a P-matrix 315-c of another size different than P-matrix 315-a (for example, a 2×2 P-matrix) to modulate across frequency tones 320. That is, the AP 105-b may spread the space-time-streams over blocks of tones using the P-matrix 315-c to separate the streams across the full set of frequency resources and may modulate the space-time-streams across the time resources (for example, the LTF symbols) using the P-matrix 315-a. The AP 105-b may differentiate a larger number of streams than the number of LTFs by modulating the LTFs across both OFDM symbols and across blocks of frequency tones 320 using two P-matrices 315. In some implementations, the product of the dimensions of the selected P-matrices 315-a and 315-c may be greater than or equal to the number of space-time-streams, which may allow for differentiating the full set of space-time-streams during the second LTF modulation technique 310-b.

In some implementations, the AP 105-b may utilize LTF compression techniques in addition to LTF modulation techniques 310. For example, the AP 105-b may use shorter or compressed LTFs (for example, 1× or 2× LTFs) in a packet for transmission. The AP 105-b may transmit these short LTFs across a smaller number of tones. As compared to transmitting an uncompressed LTF, the AP 105-b may transmit 2× LTFs on one half the tones of the uncompressed LTF and may transmit 1× LTFs on one quarter of the tones of the uncompressed LTF. In further examples, the AP 105-b may use other sizes of compressed LTFs in packet transmissions over other specified tones. A STA 115-b receiving a compressed LTF may perform additional interpolation as compared to a STA 115-b receiving an uncompressed LTF to estimate the channel across the full set of frequency tones 320. In some implementations, the amount of interpolation performed by the STA 115-b may increase as the LTF compression factor increases. In one specific example, the AP 105-b may implement the first LTF modulation technique 310-a for modulating 2× LTFs using sixteen space-time-streams across half a set of frequency tones 320, where subsets of the streams are interleaved in this half set of frequency tones 320. In this example, a receiving STA 115-*b* may interpolate to estimate the channel for the interleaved frequency tones 320 for each space-time-stream based on the first LTF modulation technique 310-*a*. Additionally, the receiving STA 115-*b* may interpolate to estimate the channel for the other half set of frequency tones 320 based on the LTF compression.

In some wireless communications systems 300, a STA 115-*b* may transmit a packet with an LTF section on the uplink to the AP 105-*b*. For example, the STA 115-*b* may transmit the packet in a multi-user (MU) multiple-input, multiple-output (MIMO) system. In some implementations of this uplink MU-MIMO LTF design, the LTF section may be long (for example, longer than an LTF threshold length), which may impact the reliability and accuracy of carrier phase tracking. Phase tracking may occur on a per-STA 115 or per-AP 105 basis. In transmissions involving long LTF sections, a STA 115-*b* may implement a method involving tone-interleaved LTFs or other LTF modulation techniques 310 similar to those described above with respect to downlink 305 transmissions from the AP 105-*b*.

In some implementations, the wireless communications system 300 may implement a number of cyclic shift delays (CSDs) for signal transmission and per-stream orthogonality. CSDs may reduce correlation and improve diversity between space-time-streams and may result in improved automatic gain control (AGC) settings at a receiving device. An AP 105-*b* may use a CSD table to determine signal timing, where each table value corresponds to a time interval $T_{CS,VHT}^{(n)}$ (for example, a certain number of nanoseconds (ns)) that the AP 105-*b* may delay a transmission for the corresponding space-time-stream. The AP 105-*b* may store such a CSD table in memory and may identify values from the CSD table for transmissions (for example, physical layer convergence protocol (PLCP) protocol data unit (PPDU) transmissions) using multiple spatial streams. The CSD values in the table may be determined such that the spatial streams are de-coupled and have timing diversity better than some threshold timing diversity (for example, at least 50 ns). A CSD value may relate to the number of total space-time-streams present in a system or may be constant for a given space-time-stream index no matter the number of space-time-streams in the system. Multiple CSD tables may be constructed for various numbers of space-time-streams based on measurements, simulations, optimizations, or other techniques. An example of a CSD table constructed for transmission of up to eight total space-time-streams is given below:

TABLE 1

$T_{CS,VHT}^{(n)}$ values for the modulated fields of a PPDU

| Total number of space-time-streams ($N_{STS,total}$) | Cyclic Shift for space-time-stream n (ns) | | | | | | | |
|---|---|---|---|---|---|---|---|---|
| | 1 | 2 | 3 | 4 | 5 | 6 | 7 | 8 |
| 1 | 0 | — | — | — | — | — | — | — |
| 2 | 0 | −400 | — | — | — | — | — | — |
| 3 | 0 | −400 | −200 | — | — | — | — | — |
| 4 | 0 | −400 | −200 | −600 | — | — | — | — |
| 5 | 0 | −400 | −200 | −600 | −350 | — | — | — |
| 6 | 0 | −400 | −200 | −600 | −350 | −650 | — | — |
| 7 | 0 | −400 | −200 | −600 | −350 | −650 | −100 | — |
| 8 | 0 | −400 | −200 | −600 | −350 | −650 | −100 | −750 |

Table 1 may be an example of a CSD table for a legacy system, with support for up to eight space-time-streams. Similar tables may exist for systems supporting a larger number of space-time-streams (for example, up to sixteen space-time-streams in an EHT system). In such examples, the CSDs for the first eight streams may be based on Table 1 or may include values different than those given in Table 1. In some implementations, a CSD reference table may follow a nested structure, where for each incremental total number of space-time-streams, the cyclic shifts for each stream may be the same as for the previous total number of space-time-streams, with one additional cyclic shift value for the additional stream. Additionally, the CSD table may contain alternating large and small values for the space-time-streams (where "large" and "small" are in comparison to the other CSD values), which may serve to maintain cyclic shift separation between adjacent streams.

One example CSD table supporting sixteen space-time-streams is given below. This example follows a nested structure, so the cyclic shift values for the first eight spatial streams are given by Table 1. Additionally, this example follows steps—or cyclic shift diversity thresholds—of 50 ns and a maximum cyclic shift value of 800 ns. The cyclic shift values for the additional streams may be determined such that the CSDs are a certain threshold away from the existing stream CSDs and the other additional stream CSDs. In an example, a new stream cyclic shift value may be an average calculated from values of other cyclic shift values. The additional values for the CSD table supporting a high volume of space-time-streams may be calculated using any averaging or numerical optimization methods or simulations to maximize performance of the spatial streams. In a system supporting sixteen space-time-streams, a nested CSD table may include the following table entries corresponding to the cyclic shifts for space-time-streams 9-16:

TABLE 2

Additional $T_{CS,VHT}^{(n)}$ values for Space-Time-Streams 9-16

| | Space-Time-Stream n | | | | | | | |
|---|---|---|---|---|---|---|---|---|
| | 9 | 10 | 11 | 12 | 13 | 14 | 15 | 16 |
| Cyclic Shift (in ns) | −250 | −550 | −300 | −450 | −50 | −700 | −150 | −500 |

These CSD table values are given as examples. It is to be understood that many other permutations of the new CSD table entries are possible and depending on the implementation, performance benefits may vary.

Additionally, or alternatively, the AP 105-*b* and the STA 115-*b* supporting a high volume of space-time-streams (for example, up to sixteen streams) may communicate using modified signals as compared to legacy systems (for example, systems supporting up to eight space-time-streams). For example, the AP 105-*b* may allocate additional bits to the High Efficiency Signal A Field (HE-SIG-A) to support the additional space-time-streams. The AP 105-*b* may further introduce additional rows for a spatial configuration field encoding for the High Efficiency Signal B Field (HE-SIG-B). In some implementations, the AP 105-*b* may maintain support for a lower number of users in a MU-MIMO system despite the additional space-time-streams. For example, the AP 105-*b* may support transmitting to up to eight users (that is, different STAs 115) using sixteen spatial streams for MU-MIMO transmissions.

Figure 4:
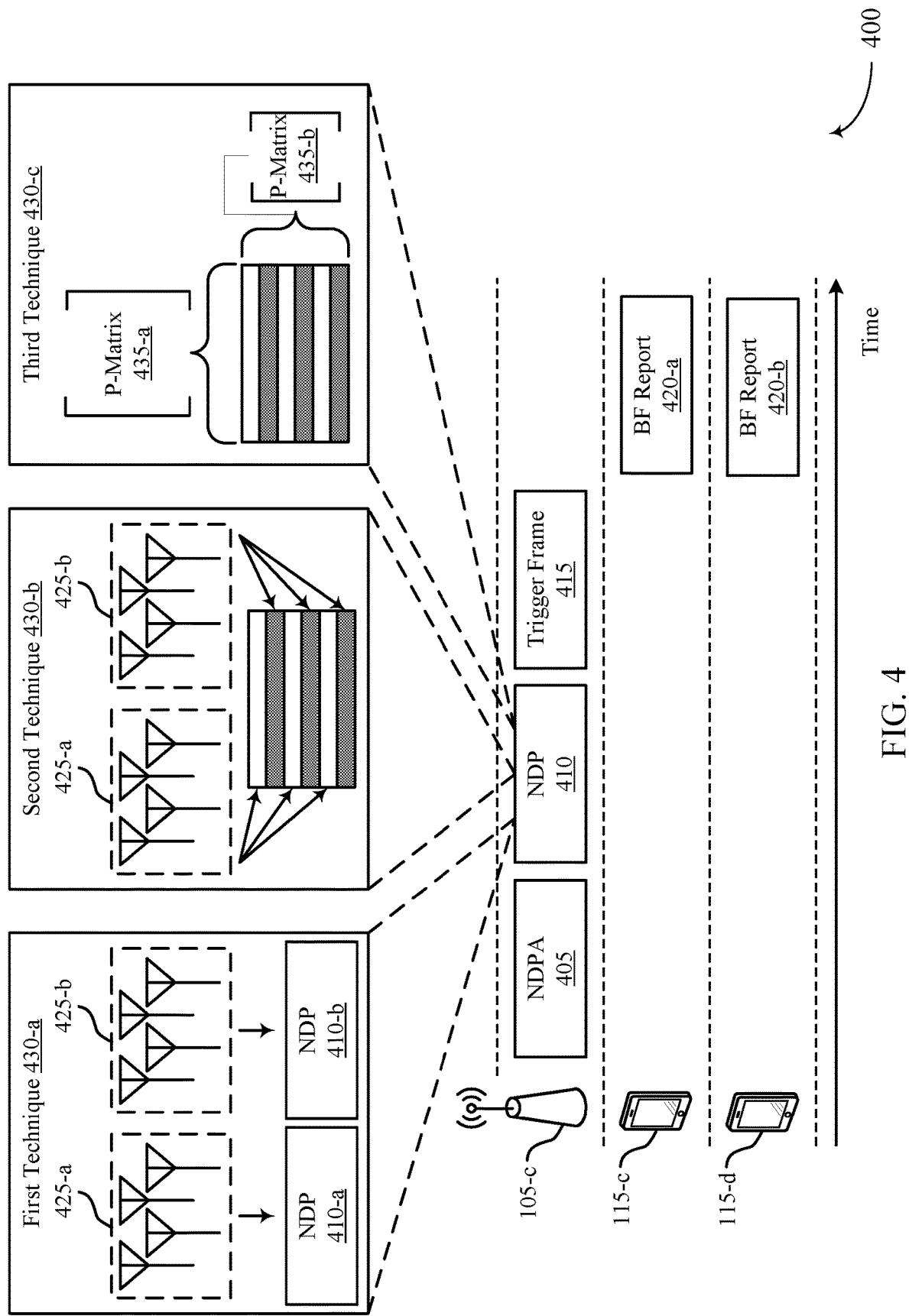
FIG. 4 shows an example of techniques for transmitting a null data packet (NDP) in a wireless communications system that supports high volumes of space-time-streams.

FIG. 4 shows an example of techniques for transmitting an NDP in a wireless communications system 400 that supports high volumes of space-time-streams. The wireless communications system 400 may be an example of a Next Generation or EHT Wi-Fi system, and may include an AP 105-c, a STA 115-c, and a STA 115-d, which may be examples of the corresponding devices described with respect to FIGS. 1-3. The AP 105-c may transmit a null data packet announcement (NDPA) 405, one or more NDPs 410, and a trigger frame 415. Each STA 115 may transmit a beam forming (BF) report 420. For example, STA 115-c may transmit BF report 420-a and STA 115-d may transmit BF report 420-b. The AP 105-c may include a total number of antennas or antenna ports for transmitting NDPs 410 on space-time-streams. However, some STAs 115 may not be configured to receive the number of streams that the AP 105-c is transmitting. To manage this, the AP 105-c may transmit the one or more NDPs 410 using a first technique 430-a, a second technique 430-b, or a third technique 430-c. In the first technique 430-a, the AP 105-c may transmit a first NDP 410-a using a first group of antennas 425-a and a second NDP 410-b using a second group of antennas 425-b. In the second technique 430-b, the AP 105-c may transmit a single NDP 410, where the AP 105-c may transmit the single NDP 410 on a first set of streams in a first set of tones using a first group of antennas 425-a and on a second set of streams in a second set of tones using a second group of antennas 425-b. As discussed above, the antennas may refer to physical antennas or logical antenna ports. In the third technique 430-c, the AP 105-c may modulate the NDP 410 across LTF symbols using a first P-matrix 435-a and may modulate across pairs or groups of adjacent frequency tones using a second P-matrix 435-b. Each of the first technique 430-a, the second technique 430-b, and the third technique 430-c may support STAs 115 that may not process the full number of LTFs or streams in sounding.

In some implementations, NDPs 410 may remain unchanged for systems supporting high volumes of space-time-streams as compared to systems supporting lower volumes of space-time-streams, such as eight space-time-streams. In some other implementations, the NDP 410 format may change based on the numbers of space-time-streams used for transmission. The increased volume of space-time streams may have implications for other signaling processes, such as the production of BF reports 420. In some implementations, a BF report 420 may include additional components or additional supported angles based on the larger number of spatial streams. These new angles may be used for rotation for other feedback configurations (for example, for higher dimensioned matrices) and may be sent or indicated in BF feedback by a STA 115 or AP 105. Additionally, or alternatively, other fields may be modified due to the high volume of supported space-time-streams, such as a number of columns (nc) sub-field, which may include an additional bit to indicate the larger number of supported streams.

In the wireless communications system 400, the AP 105-c may manage a number of STAs 115 with different sounding capabilities. For example, one set of STAs, including STA 115-c, may not be configured to process spatial multiplexing with a high volume of space-time-streams or corresponding LTFs (for example, sixteen space-time-streams or sixteen LTFs), while another set of STAs 115, including STA 115-b (which may be an example of an EHT Wi-Fi device) may support processing the full number of space-time-streams or LTFs. An AP 105-c may employ a number of techniques 430 to support communication with STAs 115 capable of processing up to eight spatial streams while efficiently communicating with STAs 115 capable of processing up to sixteen spatial streams. In this way, the AP 105-c may accommodate STAs 115 with lesser sounding capabilities while communicating using improved spatial multiplexing and spectral efficiency with STAs 115 supporting greater sounding capabilities.

In a first technique 430-a, the AP 105-c may contain a set of antennas—that is, physical antennas or logical antenna ports—to transmit information to a STA 115-c. The AP 105-c may perform a sounding process to transmit a sequence of NDPs 410-a and 410-b, where each NDP 410 contains a number of LTFs within the sounding capability of the STA 115-c. During the sounding process, the AP 105-c may sound a first group of antennas 425-a of the total set of antennas to transmit the first NDP 410-a in a first attempt and may sound a second group of antennas 425-b of the total set of antennas to transmit a second NDP 410-b in a second attempt. This first group of antennas 425-a and second group of antennas 425-b may overlap (for example, share at least one same antenna between the two groups) or may be mutually exclusive. For example, if the AP 105-c utilizes sixteen space-time-streams (and, correspondingly, sixteen LTFs), and the STA 115-c is capable of processing eight space-time-streams or LTFs, the AP 105-c may transmit two NDPs 410 each containing eight of the sixteen LTFs. In such implementations, the receiving STA 115-c may stitch the two channel components together to determine the sixteen LTFs. In some implementations, the different groups of antennas 425-a and 425-b may have different automatic gain control (AGC) states as processed by STA 115-c, for example, due to transmitting the NDPs 410 in different attempts. The STA 115-c may calibrate out or otherwise mitigate any differences in the AGC states in order to stitch the channel components. Additionally, or alternatively, the AP 105-c may freeze the phase for transmission of the different NDPs 410 to remove or mitigate any phase offset across the groups of antennas 425 transmitting the NDPs 410 at different times. This also may improve reception and stitching of the two channel components at the receiving STA 115-c.

In a second technique 430-b, the AP 105-c may perform tone-interleaving using a single NDP 410 over different sets of tones to support sounding a higher number of streams than the number of LTFs (for example, sixteen streams with eight LTFs). The AP 105-c may modulate a transmission using an orthogonal P-matrix or multiple P-matrices. The AP 105-c may transmit the NDP 410 on a first set of tones using a first subset of antennas 425-a and may further transmit the NDP 410 on a second set of tones using a second subset of antennas 425-b. In some implementations, the first and second set of tones may be half of the total number of tones used for transmission and may be interleaved in the frequency domain. In some implementations, the first subset of antennas 425-a and the second subset of antennas 425-b may contain one or more shared antennas for improved reception and stitching at the receiving STA 115-c. For example, antennas shared between the first and second subsets of antennas 425 may serve as phase references for the receiving STA 115-c.

In a third technique 430-c, the AP 105-c may use an orthogonal code (for example, an orthogonal cover code (OCC) or some other orthogonal code, such as a P-matrix) for frequency domain modulation in addition to an orthogonal P-matrix 435-a used for time domain modulation. In one implementation, the AP 105-c may use one P-matrix 435-a of one size (for example, an 8×8 P-matrix) for modulation across LTF symbols in the time domain and may use a second P-matrix 435-*b* of another size (for example, a 2×2 P-matrix) for modulation across adjacent tones in the frequency domain. This may allow a STA 115-*c* capable of receiving 8 space-time-streams or LTFs to differentiate sixteen space-time-streams.

Figure 5:
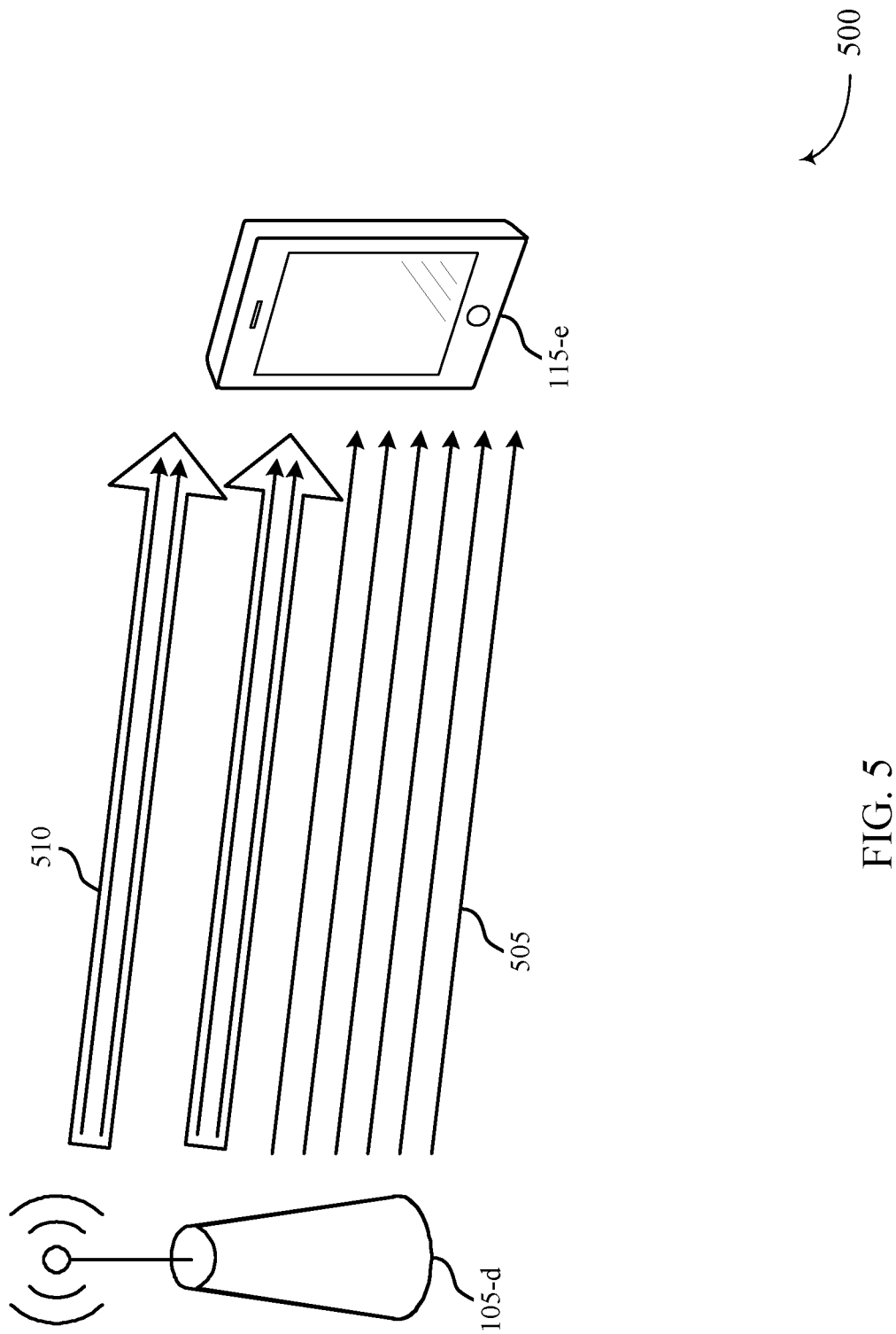
FIG. 5 shows an example of space-time-stream and super stream transmissions in a wireless communications system that supports high volumes of space-time-streams.

FIG. 5 shows an example of space-time-stream and super stream transmissions in a wireless communications system 500 that supports managing high volumes of space-time-streams. The wireless communications system 500 may be an example of a Next Generation or EHT Wi-Fi system, and may include an AP 105-*d* and a STA 115-*e*, which may be examples of the devices described with respect to FIGS. 1-4. The AP 105-*d* may transmit one or more packets (such as an NDP) to the STA 115-*e* in space-time-streams 505. The AP 105-*d* may combine some space-time-streams 505 to form super streams 510. If the STA 115-*e* is configured for a high volume of streams (for example, greater than eight streams), the STA 115-*e* may detect and receive all of the space-time-streams 505. If the STA 115-*e* is not configured for a high volume of streams, the STA 115-*e* may detect the super streams 510 as if they are space-time-streams 505, so that, as illustrated, the STA 115-*e* may detect and receive eight space-time-streams 505, rather than the full ten transmitted space-time-streams 505.

The AP 105-*d* may transmit a high volume of space-time-streams (for example, greater than eight space-time-streams) in a wireless communications system 500 containing STAs 115 that are not equipped to support a high volume of streams based on one or more capabilities of the STAs 115. In some implementations, the AP 105-*d* may transmit a high volume of streams by implementing super-streaming techniques, which may group or combine a number of space-time-streams 505 into super streams 510 to accommodate the legacy STAs 115 capable of receiving up to a threshold number of streams (for example, eight space-time-streams) while still transmitting with more streams than the threshold number of streams. In some other implementations, super-streaming techniques may include reducing the number of LTFs corresponding to a high volume of space time streams. If a STA 115-*e* is configured to support a high volume of streams, the STA 115-*e* may detect and receive each of the multiple space-time-streams 505 within super stream 510 separately, or as individual streams. In some other implementations, where the STA 115-*e* is unable to support a high volume of streams, the STA 115-*e* may detect and receive a super stream 510 as a single space-time-stream 505. In some implementations, an AP 105-*d* transmitting, for example, sixteen space-time-streams 505 may transmit eight super streams 510, where each super stream 510 contains two single space-time-streams 505. This may result in some STAs 115 receiving sixteen streams for a single transmission while other STAs receive a different number of streams due to the different capabilities of the STAs 115. In some other implementations, an AP 105-*d* may transmit ten space-time-streams 505 including two super streams 510, where each super stream 510 contains two of the space-time-streams 505. This may result in a subset of the STAs 115 in the wireless communications system 500 detecting ten streams (the ten space-time-streams 505) while a different subset of STAs 115 may detect eight streams (the two super streams 510 and the six uncombined space-time-streams 505).

In some implementations, STAs 115 and APs 105 may implement super streams 510 in uplink and downlink transmissions, such as MU-MIMO LTF transmissions. In some implementations, an AP 105 may transmit a packet in a downlink MU-MIMO system to a STA 115, which may not be configured to support a high volume of space-time streams. In one implementation, some STAs 115 served by an AP 105 may support up to sixteen total space time streams, while another STA 115 served by AP 105 may support reception of eight total space time streams. In order to transmit for example, twelve space time streams in a downlink MU-MIMO transmission, AP 105 may transmit four singular space time streams along with four super streams each consisting of two singular space-time streams. In this example, STAs 115 supporting a high volume of space time streams may receive the transmission as containing twelve total space time streams, while the STA 115 with lesser reception capabilities may receive the transmission as containing eight total space time streams.

The STAs 115 may use a P-matrix for LTF modulation and transmission across tones. The AP 105-*d* may allocate a row of the P-matrix (e.g., a channel estimation resource) to a STA 115-*e*, where the STA 115-*e* is configured for a lower volume of streams. For STAs 115 supporting a higher volume of streams, the AP 105-*d* may allocate some rows of the P-matrix such that the rows shift during modulation between different streams across tones. For example, an EHT STA 115 may rotate a row of the P-matrix between space-time-streams from tone-to-tone, generating two streams from a single row of the P-matrix. The AP 105-*d* receiving the two streams may perform interpolation to estimate the channel for the in-between tones. For example, if the EHT STA 115 modulates streams 1-6 on a first tone and streams 7-12 on a second tone, the AP 105-*d* may interpolate LTF values for streams 7-12 on the first tone and interpolate LTF values for streams 1-6 on the second tone. In another example, APs 105-*d* may share the same row of the P-matrix.

Figure 6:
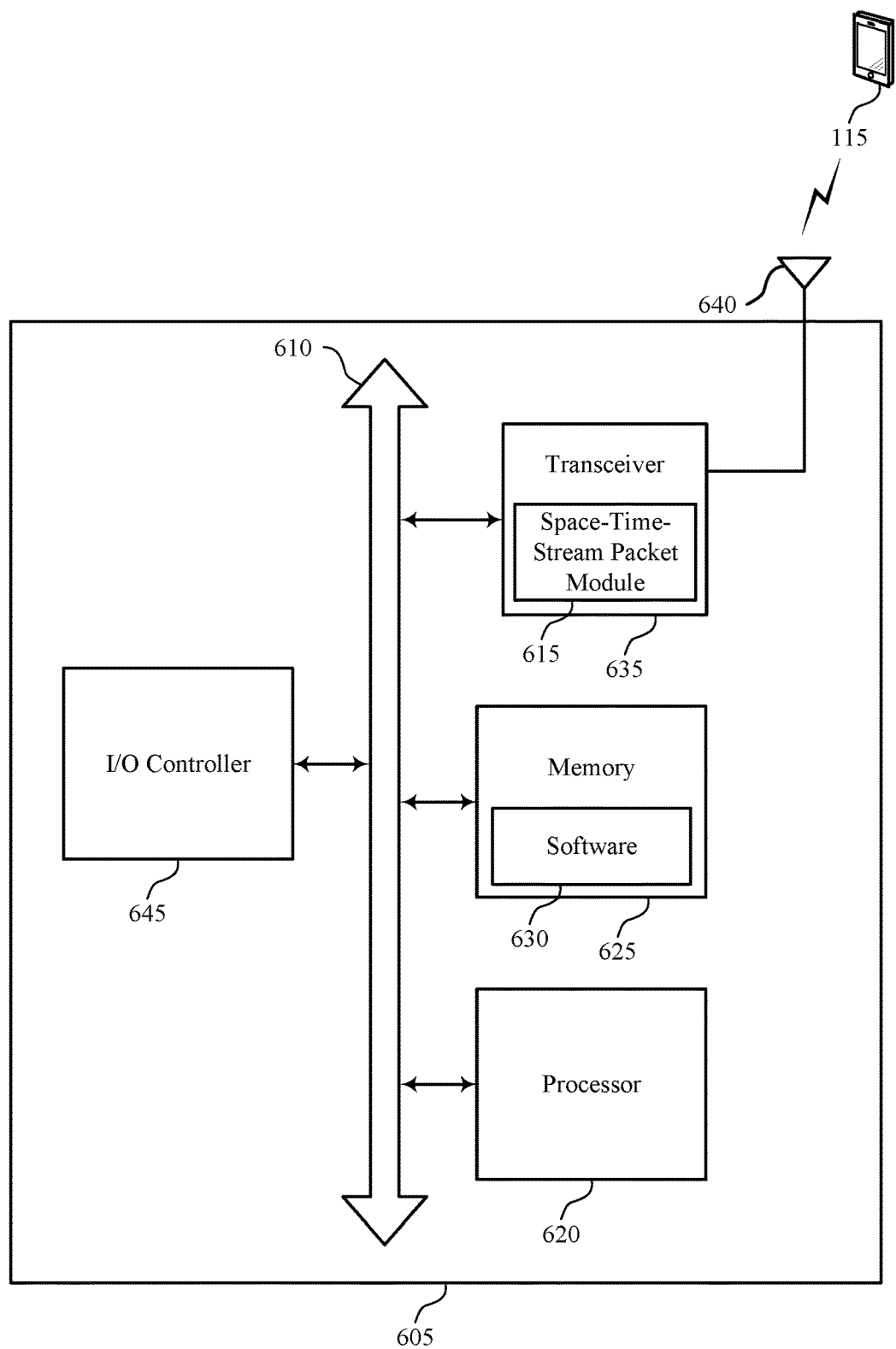
FIG. 6 shows a block diagram of an example system including an access point (AP) that supports high volumes of space-time-streams.

FIG. 6 shows a block diagram of an example system 600 including an AP 605 that supports high volumes of space-time-streams. The AP 605 may be an example of a wireless device configured to operate in a Next Generation or EHT Wi-Fi system. The AP 605 may include components for bi-directional voice and data communications including components for transmitting and receiving communications, such as a processor 620, a memory 625, software 630, a transceiver 635, an antenna 640, and an input/output (I/O) controller 645. These components may be in electronic communication via one or more buses, such as a bus 610. The transceiver 635 may include a space-time-stream packet module 615 configured to implement one or more of the techniques described with respect to FIGS. 1-5, in cooperation with the processor 620, a memory 625, software 630, antenna 640, and I/O controller 645.

The space-time-stream packet module 615 may perform a number of operations for managing high volumes of space-time-streams. For example, the space-time-stream packet module 615 may handle transmitting packets to different types of STAs 115, where some STAs 115 in the system 600 are capable of processing up to eight space-time-streams and other STAs 115 in the system 600 are capable of processing more than eight space-time-streams. For example, the first type of STAs 115 may be referred to as "legacy" STAs, and the second type of STAs 115 may be referred to as "EHT" STAs and may process up to sixteen space-time-streams (i.e., a "high volume" of space-time-streams). In some implementations, in addition or alternative to having a limit on space-time-stream processing capabilities, a STA 115 may have similar limits on processing LTFs in sounding. For example, legacy STAs may support processing up to eight LTFs in sounding, while EHT STAs may support processing up to sixteen LTFs in sounding.

In a first example, the space-time-stream packet module 615 may identify a number of space-time-streams for transmission of NDP information in a set of tones, where the number of space-time-streams is greater than a threshold number of streams. This threshold number of streams may be based on the different capabilities of STAs 115 in the system 600. For example, the threshold number of streams may be equal to eight streams, where a subset of the STAs 115 support processing more than the threshold number of streams and another subset of STAs 115 support processing less than or equal to the threshold number of streams. The space-time-stream packet module 615, via the transceiver 635 and antennas 640, may transmit a first subset of the NDP information using a first subset of the antennas 640, such as half of the antennas 640, and may transmit a second subset of the NDP information using a second subset of the antennas 640, such as the other half of the antennas 640.

In a second example, the space-time-stream packet module 615 may identify the number of space-time-streams for transmission of a packet, where the number of space-time-streams is greater than the threshold number of streams. This packet may include an LTF section spanning one or more OFDM symbols. The space-time-stream packet module 615 may select an orthogonal matrix for modulation of the LTF section. In some implementations, the orthogonal matrix may be selected from a lookup table in the memory 625. A size of the first dimension and the second dimension of the matrix may be less than the identified number of space-time-streams. The space-time-stream packet module 615 may modulate the LTF section over the space-time-streams using the selected orthogonal matrix—that is, the space-time-stream packet module 615 may spread the space-time-streams over the OFDM symbols of the LTF section using the selected orthogonal matrix. The space-time-stream packet module 615 may use tone-interleaving with interpolation or separate matrices in time and frequency to fully spread the signal using a matrix with dimensions smaller than the number of space-time-streams. The space-time-stream packet module 615, via the transceiver 635 and antenna(s) 640, may transmit the packet including the modulated LTF section over a set of tones using the space-time-streams.

In a third example, the space-time-stream packet module 615 may identify the number of space-time-streams for transmission of a packet, where the number of space-time-streams is greater than the threshold number of streams. The space-time-stream packet module 615 may combine some of the space-time-streams to form one or more super streams and obtain a total number of streams equal to or less than the threshold number of streams. For example, if the space-time-stream packet module 615 identifies ten streams, but the threshold number of streams is eight, the space-time-stream packet module 615 may form two super streams composed of two space-time-streams each. The space-time-stream packet module 615, via the transceiver 635 and antenna(s) 640, may transmit the packet over a set of tones using the super streams and space-time-streams. Legacy STAs 115 may receive each super stream as a single space-time-stream, while EHT STAs 115 may receive each super stream as its component space-time-streams. Accordingly, in the example given above, a legacy STA 115 may identify eight streams while an EHT STA 115 may identify ten streams for the same transmission based on these super streams.

In a fourth example, the space-time-stream packet module 615 may identify the number of space-time-streams for transmission of NDP information in a set of tones. This NDP information may include an LTF section spanning one or more OFDM symbols. The space-time-stream packet module 615 may determine that the number of space-time-streams is greater than the threshold number of space-time-streams and may group the set of tones into tone blocks. The space-time-stream packet module 615 may modulate an NDP containing the NDP information across the OFDM symbols of the LTF section using a first orthogonal matrix and across each of the tone blocks using a second orthogonal matrix. In some implementations, these matrices may be selected from a lookup table in the memory 625. The space-time-stream packet module 615, via the transceiver 635 and antenna(s) 640, may transmit the modulated NDP over the set of tones using the space-time-streams. The space-time-stream packet module 615 may operate as described above in a single example, or in any combination of the examples.

The processor 620 may include an intelligent hardware device, such as a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or some combination of these components. The processor 620 may be configured to execute computer-readable instructions stored in a memory to perform various functions, such as the functions described with respect to the space-time-stream packet module 615.

The memory 625 may include random access memory (RAM) and read-only memory (ROM). The memory 625 may store computer-readable, computer-executable code or software 630 including instructions that, when executed, cause the processor to perform various functions described herein. In some implementations, the memory 625 may contain, among other things, a basic input/output system (BIOS) which may control basic hardware or software operation such as the interaction with peripheral components or devices.

The transceiver 635 may communicate bi-directionally, via one or more antennas 640 or antenna ports, wired, or wireless links as described above. For example, the transceiver 635 may represent a wireless transceiver and may communicate bi-directionally with another wireless transceiver. The transceiver 635 also may include a modem to modulate the packets and provide the modulated packets to the antennas 640 for transmission, and to demodulate packets received from the antennas 640. The antennas 640 may transmit packets, such as NDPs, to STAs 115 or other APs 105 within the system 600.

The I/O controller 645 may manage input and output signals for the AP 605. The I/O controller 645 also may manage peripherals not integrated into the AP 605. In some implementations, the I/O controller 645 may represent a physical connection or port to an external peripheral. In some other implementations, the I/O controller 645 may be implemented as part of a processor 620. A user may interact with the AP 605 via the I/O controller 645 or via hardware components controlled by the I/O controller 645.

The AP 605 may include alternative or additional components to those described above. For example, the AP 605 may include a network communications manager, an inter-station communications manager, or any combination of these or any other AP 605 components.

Figure 7:
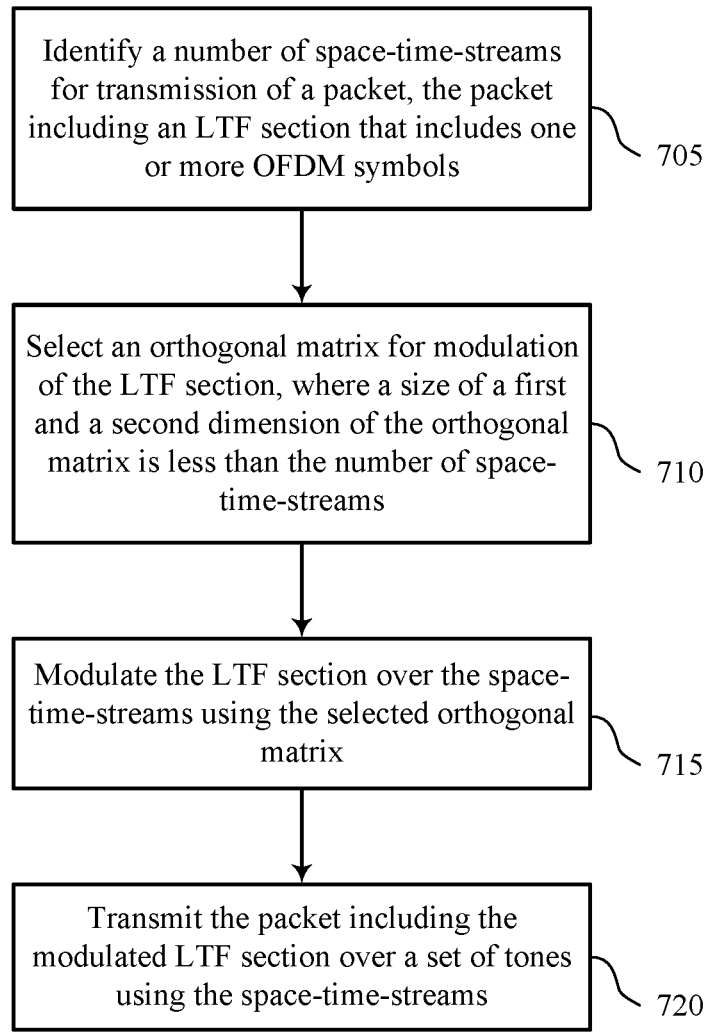
FIGS. 7-10 show flowcharts illustrating example methods for managing high volumes of space-time-streams in Next Generation Wi-Fi systems.

FIG. 7 shows a flowchart illustrating an example method 700 for managing high volumes of space-time-streams in Next Generation Wi-Fi systems. The operations of the method 700 may be implemented by an AP 105 or its components as described herein. For example, the operations of method 700 may be implemented by a space-time-stream packet module 615 as described with reference to FIG. 6.

At block 705 the AP 105 may identify a number of space-time-streams for transmission of a packet, the packet including an LTF section that contains one or more OFDM symbols. At block 710 the AP 105 may select an orthogonal matrix for modulation of the LTF section, where a size of a first and a second dimension of the orthogonal matrix is less than the number of space-time-streams. In some implementations, the size of the matrix may be based on a number of LTF indices, on a number of space-time-streams, or on a maximum supported matrix size. For example, the matrix may be an example of an 8×8 orthogonal matrix stored in the memory of the AP 105. At block 715 the AP 105 may modulate the LTF section over the space-time-streams using the selected orthogonal matrix. For example, the AP 105, using a modulator, may spread the space-time-streams over the OFDM symbols of the LTF section using the selected orthogonal matrix. In some implementations, the AP 105 may additionally perform interpolation or frequency spreading to fully modulate the LTF section. At block 720 the AP 105 may transmit, via one or more antennas and using a transmitter or transceiver, the packet including the modulated LTF section over a set of tones using the space-time-streams.

Figure 8:
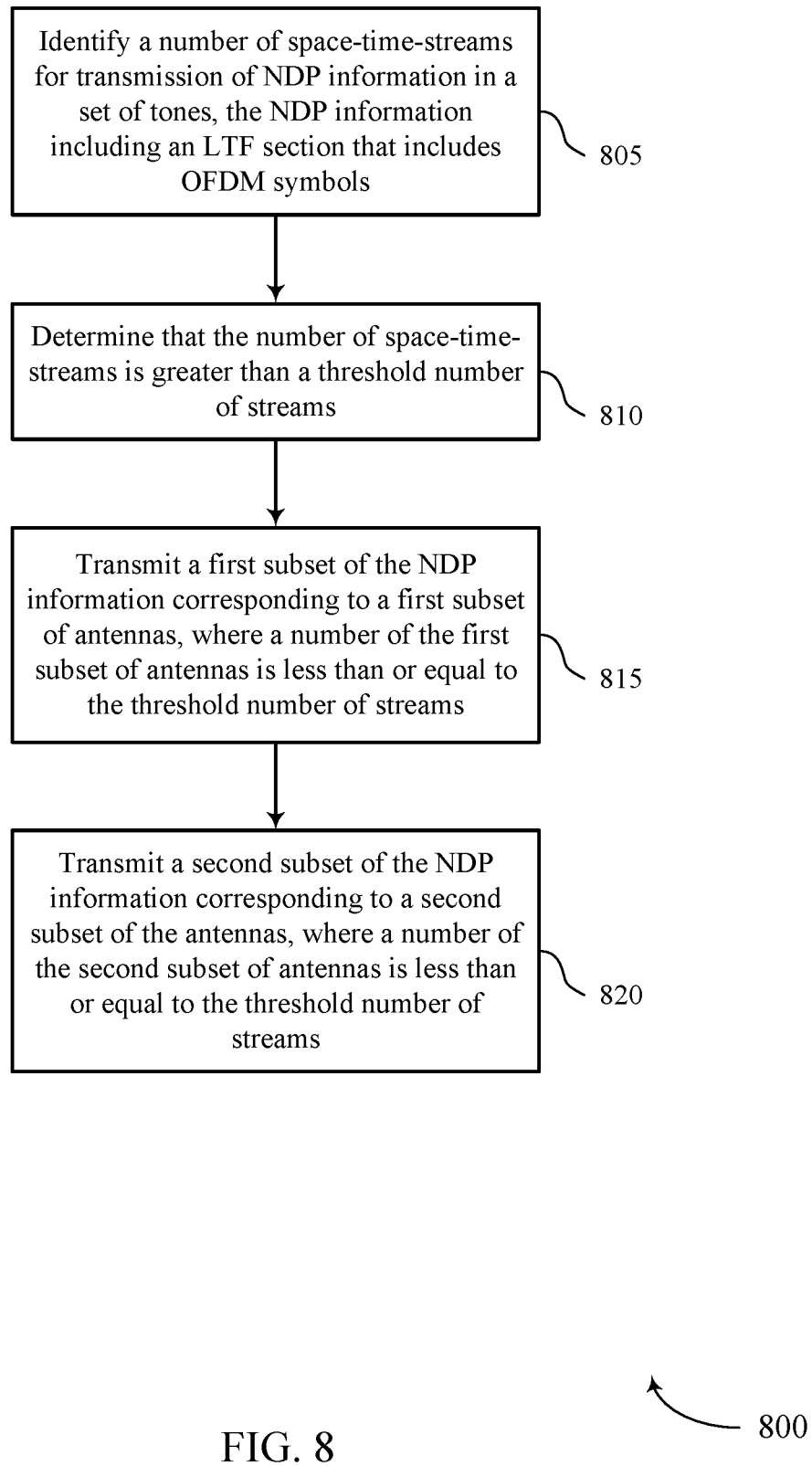

FIG. 8 shows a flowchart illustrating an example method 800 for managing high volumes of space-time-streams in Next Generation Wi-Fi systems. The operations of the method 800 may be implemented by an AP 105 or its components as described herein. For example, the operations of the method 800 may be implemented by a space-time-stream packet module 615 as described with reference to FIG. 6.

At block 805 the AP 105 may identify a number of space-time-streams for transmission of NDP information in a set of tones, the NDP information including an LTF section that contains OFDM symbols. At block 810 the AP 105 may determine that the number of space-time-streams is greater than a threshold number of streams. In some implementations, the determination may be implicit, and may be based on the system in which the AP 105 operates. For example, if the AP 105 operates within a system supporting both legacy and EHT STAs 115—that is, STAs 115 that support processing for different numbers of space-time-streams, LTFs, or both—the AP 105 may implicitly perform the following functions. At block 815 the AP 105 may transmit, using a transmitter or transceiver, a first subset of the NDP information corresponding to a first subset of antennas, where a number of the first subset of antennas is less than or equal to the threshold number of streams. At block 820 the AP 105 may transmit, using the transmitter or transceiver, a second subset of the NDP information corresponding to a second subset of the antennas, where a number of the second subset of antennas is less than or equal to the threshold number of streams.

Figure 9:
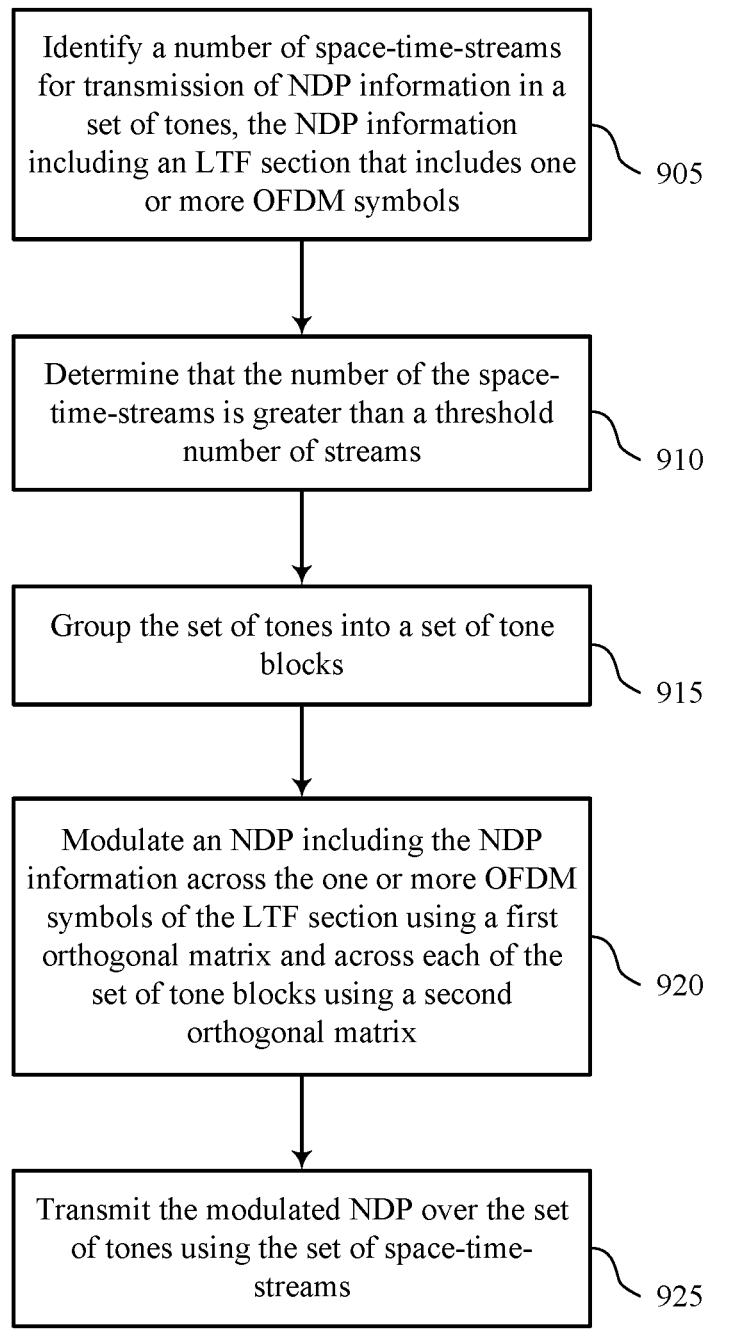

FIG. 9 shows a flowchart illustrating an example method 900 for managing high volumes of space-time-streams in Next Generation Wi-Fi systems. The operations of the method 900 may be implemented by an AP 105 or its components as described herein. For example, the operations of the method 900 may be may be implemented by a space-time-stream packet module 615 as described with reference to FIG. 6.

At block 905 the AP 105 may identify a number of space-time-streams for transmission of NDP information in a set of tones, the NDP information including an LTF section that contains one or more OFDM symbols. At block 910 the AP 105 may determine (implicitly or explicitly) that the number of the space-time-streams is greater than a threshold number of streams. The threshold number of streams may be based on the capabilities of STAs 115 in the system. At block 915 the AP 105 may group the set of tones into a number of tone blocks. At block 920 the AP 105 may modulate an NDP including the NDP information across the one or more OFDM symbols of the LTF section using a first orthogonal matrix and across each of the number of tone blocks using a second orthogonal matrix. These orthogonal matrices may be stored in the memory of the AP 105. In one example, the first orthogonal matrix is an 8×8 orthogonal matrix and the second orthogonal matrix is a 2×2 orthogonal matrix. At block 925 the AP 105 may transmit the modulated NDP over the set of tones using the number of space-time-streams. The AP 105 may perform this transmission using a transmitter or transceiver and one or more antennas or antenna ports.

Figure 10:
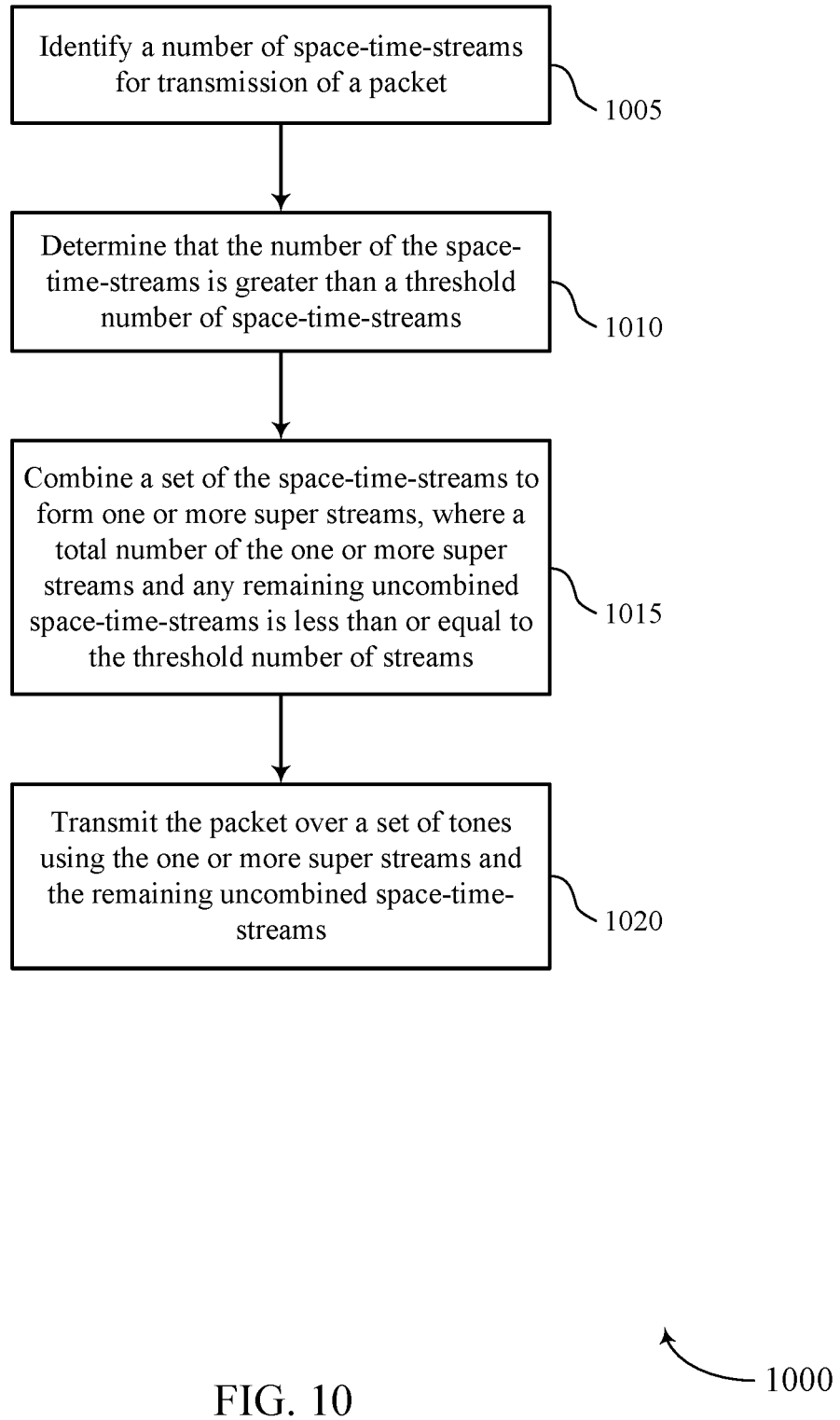

FIG. 10 shows a flowchart illustrating an example method 1000 for managing high volumes of space-time-streams in Next Generation Wi-Fi systems. The operations of the method 1000 may be implemented by an AP 105 or its components as described herein. For example, the operations of the method 1000 may be implemented by a space-time-stream packet module 615 as described with reference to FIG. 6.

At block 1005 the AP 105 may identify a number of space-time-streams for transmission of a packet. At block 1010 the AP 105 may determine (implicitly or explicitly) that the number of the space-time-streams is greater than a threshold number of space-time-streams. In some implementations, this determination may be based on the capabilities of different STAs 115 serviced by the AP 105. At block 1015 the AP 105 may combine a number of the space-time-streams to form one or more super streams, where a total number of the one or more super streams and any remaining uncombined space-time-streams is less than or equal to the threshold number of streams. For example, if the AP 105 determines to transmit the packet using sixteen space-time-streams, but a subset of the STAs 115 (legacy STAs) receiving the space-time-streams support up to eight space-time-streams, the AP 105 may instead transmit the packet using eight super streams, where each super stream contains two space-time-streams. At block 1020 the AP 105 may transmit the packet over a set of tones using the one or more super streams and the remaining uncombined space-time-streams. For example, the AP 105 may transmit the super streams and space-time-streams using a transmitter or transceiver and any number of antennas or antenna ports. A legacy STA 115 supporting eight streams receiving the packet may identify eight streams (for example, the eight super streams), while an EHT STA 115 supporting sixteen streams receiving the packet may identify sixteen streams (for example, the sixteen space-time-streams making up the super streams).

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a number of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, electrically erasable programmable ROM (EEPROM), compact disc ROM (CD-ROM) or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some implementations be excised from the combination, and the claimed combination may be directed to a subcombination or variation of a subcombination.

Similarly, while operations are depicted in the drawings in a particular order, this may not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above may not be understood as requiring such separation in all implementations, and it may be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A method for wireless communication, comprising:
identifying a number of space-time-streams for transmission of null data packet (NDP) information to a station (STA) in a set of tones, the NDP information comprising a long training field (LTF) section that comprises orthogonal frequency division multiplexing (OFDM) symbols, the NDP information corresponding to a superset of antennas comprising a first subset of antennas and a second subset of antennas;
determining that the number of space-time-streams is greater than a threshold number of streams, wherein the threshold number of streams is based at least in part on a capability of the STA;
transmitting, to the STA, a first subset of the NDP information corresponding to the first subset of antennas, wherein a number of the first subset of antennas is less than or equal to the threshold number of streams;
transmitting, to the STA, a second subset of the NDP information corresponding to the second subset of antennas, wherein a number of the second subset of antennas is less than or equal to the threshold number of streams;

determining that the number of space-time-streams is less than or equal to an additional threshold number of streams for an additional STA, wherein the additional threshold number of streams is based at least in part on a capability of the additional STA; and transmitting, to the additional STA, the NDP information corresponding to the superset of antennas comprising the first subset of antennas and the second subset of antennas, wherein a number of the superset of antennas is less than or equal to the additional threshold number of streams.

2. The method of claim 1, wherein the first subset of the NDP information corresponds to a first NDP and the second subset of the NDP information corresponds to a second NDP different from the first NDP.

3. The method of claim 1, wherein:
the first subset of the NDP information and the second subset of the NDP information both correspond to a same NDP;
the first subset of the NDP information is transmitted in a first subset of the set of tones; and
the second subset of the NDP information is transmitted in a second subset of the set of tones.

4. The method of claim 1, wherein the capability of the STA comprises at least one of a total number of space-time-streams the STA can process for a single NDP and a number of LTFs the STA can process for the single NDP.

5. The method of claim 1, wherein both the first subset of antennas and the second subset of antennas comprise at least one shared antenna.

6. The method of claim 5, further comprising:
mitigating a phase offset between the first subset of the NDP information and the second subset of the NDP information based at least in part on the at least one shared antenna serving as a phase reference.

7. The method of claim 2, further comprising:
freezing a phase for transmission for the first NDP and the second NDP, wherein a phase offset between the first NDP and the second NDP is mitigated based at least in part on freezing the phase for transmission.

8. An apparatus for wireless communication, comprising:
a processor,
memory in electronic communication with the processor; and
instructions stored in the memory and executable by the processor to cause the apparatus to:
identify a number of space-time-streams for transmission of null data packet (NDP) information to a station (STA) in a set of tones, the NDP information comprising a long training field (LTF) section that comprises orthogonal frequency division multiplexing (OFDM) symbols, the NDP information corresponding to a superset of antennas comprising a first subset of antennas and a second subset of antennas;
determine that the number of space-time-streams is greater than a threshold number of streams, wherein the threshold number of streams is based at least in part on a capability of the STA;
transmit, to the STA, a first subset of the NDP information corresponding to the first subset of antennas, wherein a number of the first subset of antennas is less than or equal to the threshold number of streams;
transmit, to the STA, a second subset of the NDP information corresponding to the second subset of antennas, wherein a number of the second subset of antennas is less than or equal to the threshold number of streams;

determine that the number of space-time-streams is less than or equal to an additional threshold number of streams for an additional STA, wherein the additional threshold number of streams is based at least in part on a capability of the additional STA; and
transmit, to the additional STA, the NDP information corresponding to the superset of antennas comprising the first subset of antennas and the second subset of antennas, wherein a number of the superset of antennas is less than or equal to the additional threshold number of streams.

9. The apparatus of claim 8, wherein the first subset of the NDP information corresponds to a first NDP and the second subset of the NDP information corresponds to a second NDP different from the first NDP.

10. The apparatus of claim 8, wherein:
the first subset of the NDP information and the second subset of the NDP information both correspond to a same NDP;
the first subset of the NDP information is transmitted in a first subset of the set of tones; and
the second subset of the NDP information is transmitted in a second subset of the set of tones.

11. The apparatus of claim 8, wherein the capability of the STA comprises at least one of a total number of space-time-streams the STA can process for a single NDP and a number of LTFs the STA can process for the single NDP.

12. The apparatus of claim 8, wherein both the first subset of antennas and the second subset of antennas comprise at least one shared antenna.

13. The apparatus of claim 12, wherein the instructions are further executable by the processor to cause the apparatus to:
mitigate a phase offset between the first subset of the NDP information and the second subset of the NDP information based at least in part on the at least one shared antenna serving as a phase reference.

14. An apparatus for wireless communication, comprising:
means for identifying a number of space-time-streams for transmission of null data packet (NDP) information to a station (STA) in a set of tones, the NDP information comprising a long training field (LTF) section that comprises orthogonal frequency division multiplexing (OFDM) symbols, the NDP information corresponding to a superset of antennas comprising a first subset of antennas and a second subset of antennas;
means for determining that the number of space-time-streams is greater than a threshold number of streams, wherein the threshold number of streams is based at least in part on a capability of the STA;
means for transmitting, to the STA, a first subset of the NDP information corresponding to the first subset of antennas, wherein a number of the first subset of antennas is less than or equal to the threshold number of streams;
means for transmitting, to the STA, a second subset of the NDP information corresponding to the second subset of antennas, wherein a number of the second subset of antennas is less than or equal to the threshold number of streams; and
means for determining that the number of space-time-streams is less than or equal to an additional threshold number of streams for an additional STA, wherein the additional threshold number of streams is based at least in part on a capability of the additional STA; and means for transmitting, to the additional STA, the NDP information corresponding to the superset of antennas comprising the first subset of antennas and the second subset of antennas, wherein a number of the superset of antennas is less than or equal to the additional threshold number of streams.

15. The apparatus of claim 14, wherein:
the first subset of the NDP information corresponds to a first NDP and the second subset of the NDP information corresponds to a second NDP different from the first NDP.

16. The apparatus of claim 14, wherein:
the first subset of the NDP information and the second subset of the NDP information both correspond to a same NDP;
the first subset of the NDP information is transmitted in a first subset of the set of tones; and
the second subset of the NDP information is transmitted in a second subset of the set of tones.

17. The apparatus of claim 14, wherein:
the capability of the STA comprises at least one of a total number of space-time-streams the STA can process for a single NDP and a number of LTFs the STA can process for the single NDP.

18. The apparatus of claim 14, wherein:
both the first subset of antennas and the second subset of antennas comprise at least one shared antenna.

19. The apparatus of claim 18, further comprising:
means for mitigating a phase offset between the first subset of the NDP information and the second subset of the NDP information based at least in part on the at least one shared antenna serving as a phase reference.

20. A non-transitory computer-readable medium storing code for wireless communication, the code comprising instructions executable by a processor to:
identify a number of space-time-streams for transmission of null data packet (NDP) information to a station (STA) in a set of tones, the NDP information comprising a long training field (LTF) section that comprises orthogonal frequency division multiplexing (OFDM) symbols, the NDP information corresponding to a superset of antennas comprising a first subset of antennas and a second subset of antennas;
determine that the number of space-time-streams is greater than a threshold number of streams, wherein the threshold number of streams is based at least in part on a capability of the STA;
transmit, to the STA, a first subset of the NDP information corresponding to the first subset of antennas, wherein a number of the first subset of antennas is less than or equal to the threshold number of streams;
transmit, to the STA, a second subset of the NDP information corresponding to the second subset of antennas, wherein a number of the second subset of antennas is less than or equal to the threshold number of streams; and
determine that the number of space-time-streams is less than or equal to an additional threshold number of streams for an additional STA, wherein the additional threshold number of streams is based at least in part on a capability of the additional STA; and
transmit, to the additional STA, the NDP information corresponding to a superset of antennas comprising the first subset of antennas and the second subset of antennas, wherein a number of the superset of antennas is less than or equal to the additional threshold number of streams.

21. The non-transitory computer-readable medium of claim 20, wherein:
the first subset of the NDP information corresponds to a first NDP and the second subset of the NDP information corresponds to a second NDP different from the first NDP.

22. The non-transitory computer-readable medium of claim 20, wherein:
the first subset of the NDP information and the second subset of the NDP information both correspond to a same NDP;
the first subset of the NDP information is transmitted in a first subset of the set of tones; and
the second subset of the NDP information is transmitted in a second subset of the set of tones.

23. The non-transitory computer-readable medium of claim 20, wherein:
the capability of the STA comprises at least one of a total number of space-time-streams the STA can process for a single NDP and a number of LTFs the STA can process for the single NDP.

24. The non-transitory computer-readable medium of claim 20, wherein:
both the first subset of antennas and the second subset of antennas comprise at least one shared antenna.

25. The non-transitory computer-readable medium of claim 24, wherein the instructions are further executable to:
mitigate a phase offset between the first subset of the NDP information and the second subset of the NDP information based at least in part on the at least one shared antenna serving as a phase reference.

* * * * *